United States Patent [19]

Erich

[11] Patent Number: 4,715,240

[45] Date of Patent: Dec. 29, 1987

[54] PUMPING DEVICE

[75] Inventor: Richard R. Erich, Jackson, Calif.

[73] Assignees: George F. Bethel; Patience K. Bethel, both of Newport Beach, Calif.; a part interest

[21] Appl. No.: 770,859

[22] Filed: Aug. 29, 1985

Related U.S. Application Data

[63] Continuation-in-part of Ser. No. 443,758, Feb. 7, 1983, abandoned.

[51] Int. Cl.[4] .............................................. F16H 21/36
[52] U.S. Cl. ............................................ 74/52; 74/41; 74/410; 74/589
[58] Field of Search .................... 74/41, 52, 410, 589

[56] References Cited

U.S. PATENT DOCUMENTS

| | | | |
|---|---|---|---|
| 634,194 | 10/1899 | Woodward | 74/52 |
| 1,056,746 | 3/1913 | Pitts | 74/52 |
| 1,118,285 | 11/1914 | Johnson | 74/52 X |
| 1,275,253 | 8/1918 | Helfrich | 74/52 |
| 1,299,157 | 4/1919 | Fay | 74/589 |
| 1,465,671 | 8/1923 | Hubbard | 74/589 |
| 1,501,226 | 7/1924 | Malbaff | 74/41 |
| 1,557,223 | 10/1925 | Warner | 74/52 |
| 1,688,484 | 10/1928 | Carter | 74/589 |
| 1,712,927 | 5/1929 | Martois | 74/52 |
| 2,190,070 | 2/1940 | Holzer | 74/41 |
| 2,265,379 | 12/1941 | Lyne | 74/41 |
| 2,464,214 | 3/1949 | Cochran | 74/52 |
| 2,997,887 | 8/1961 | Lott | 74/41 |
| 3,221,419 | 12/1965 | Cohen | 74/52 |
| 3,646,833 | 3/1972 | Watson | 74/589 |
| 3,706,235 | 12/1972 | Duncan | 74/52 |
| 3,772,934 | 11/1973 | Warren | 74/410 |
| 4,023,420 | 5/1977 | Dressler | 74/52 |
| 4,237,741 | 12/1980 | Huf et al. | 74/52 |

FOREIGN PATENT DOCUMENTS 994034  8/1951  France ................................ 74/52

Primary Examiner—Allan D. Herrmann
Attorney, Agent, or Firm—George F. Bethel; Patience K. Bethel

[57] ABSTRACT

The following specification discloses an apparatus and method for providing lifting motion on a substantially symmetrical and compact basis for a pump through a linkage, comprising two members pivotally coupled for relative movement driven by a gear reducer. The first member is driven in a rotational manner with the second member connected thereto being rotationally driven at the same angular velocity, but in the reverse direction thereto. The angular velocity of the members can be controlled by gears, a timing chain and sprockets, or other timed drive means. As the first member rotates with the second member moving around the pivotal connection point at the same angular velocity, a lift point or pump connection is moved in a reciprocating manner to provide lift. The members can be appropriately counterbalanced. The members can also be provided on either side of the gear reducer to provide dual lift points. If a chain is used for timing the members, the chain can be enclosed in a housing with an oil bath. In lieu of counterweights an air balance piston can be used to balance a rod pump.

22 Claims, 27 Drawing Figures

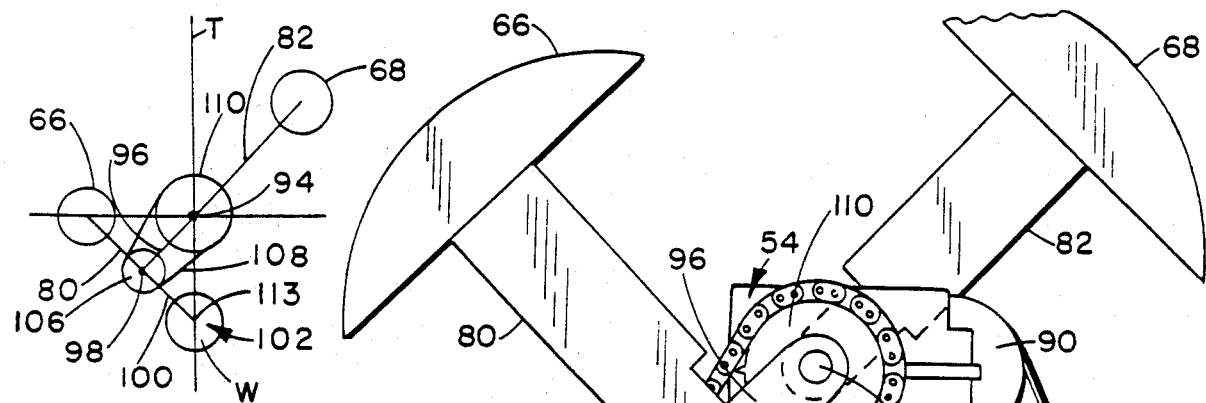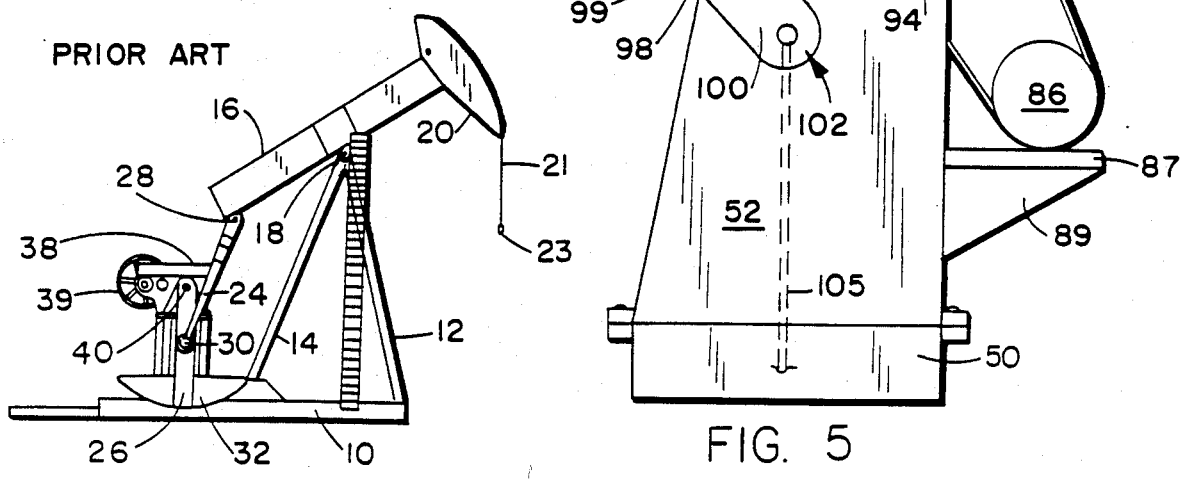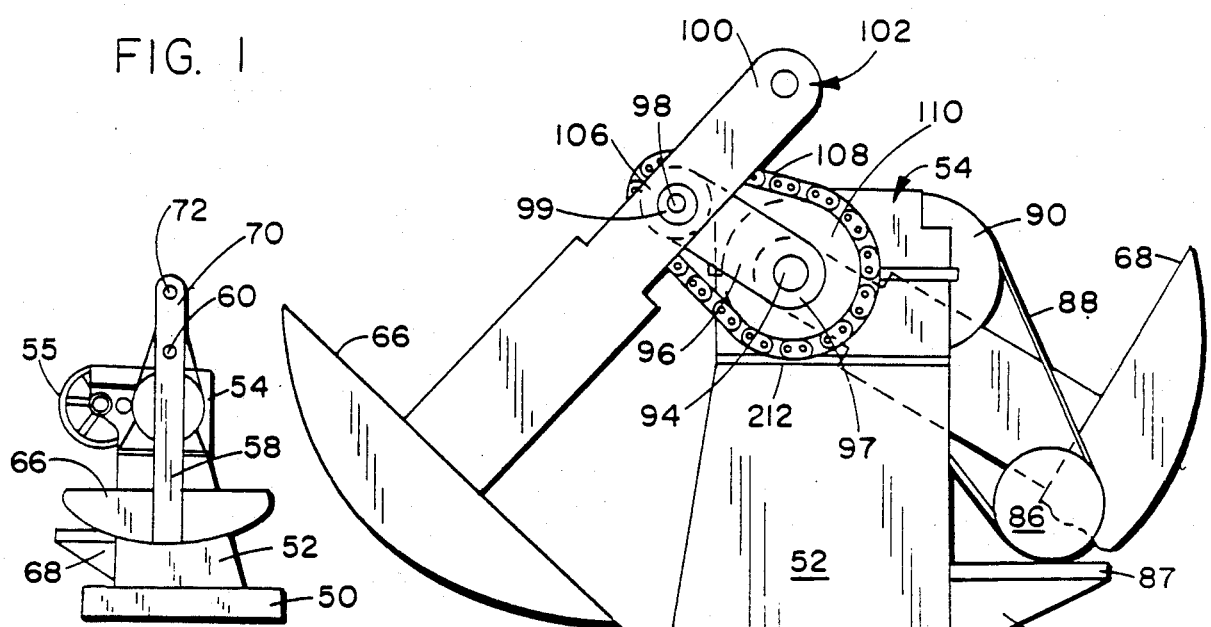

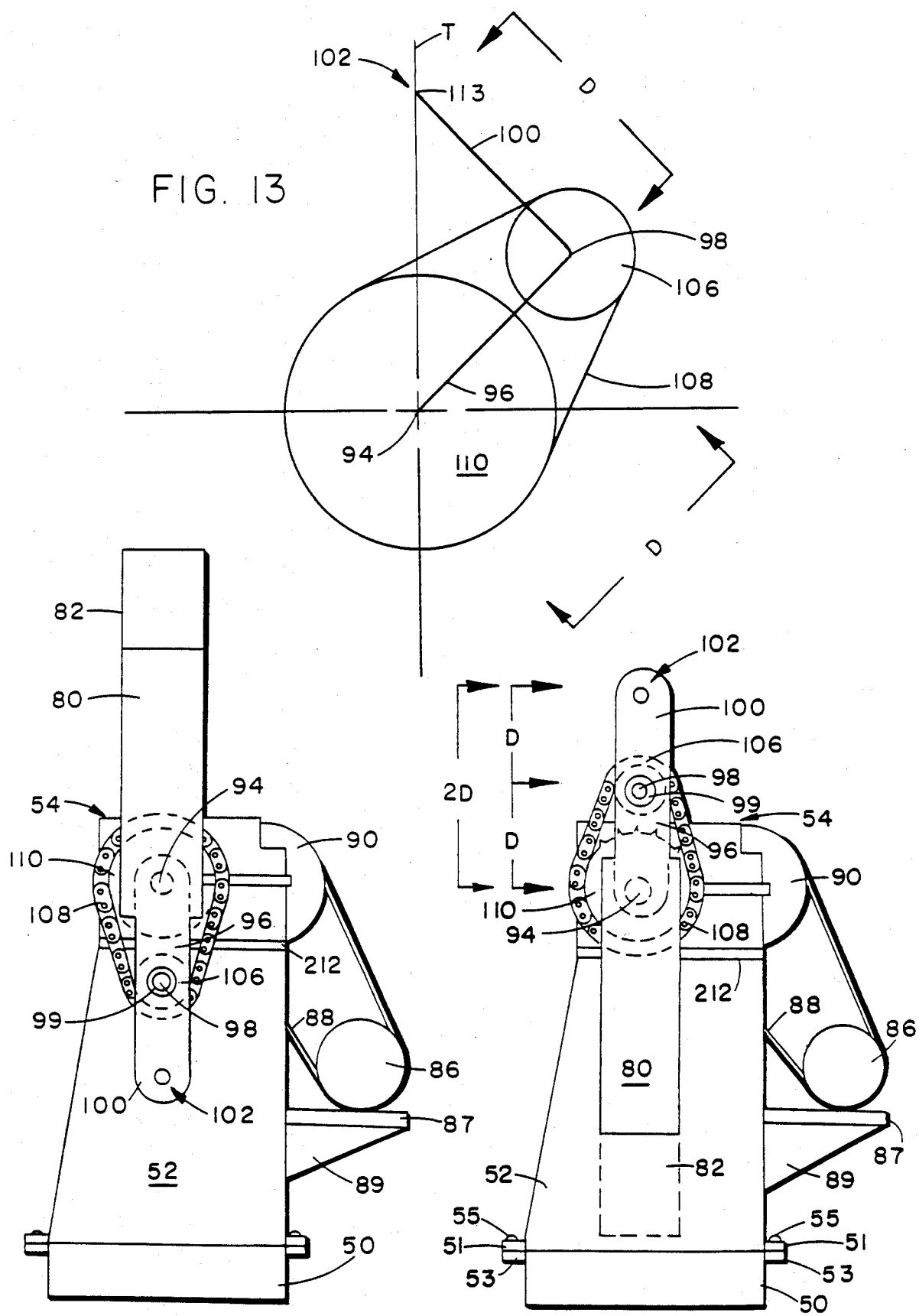

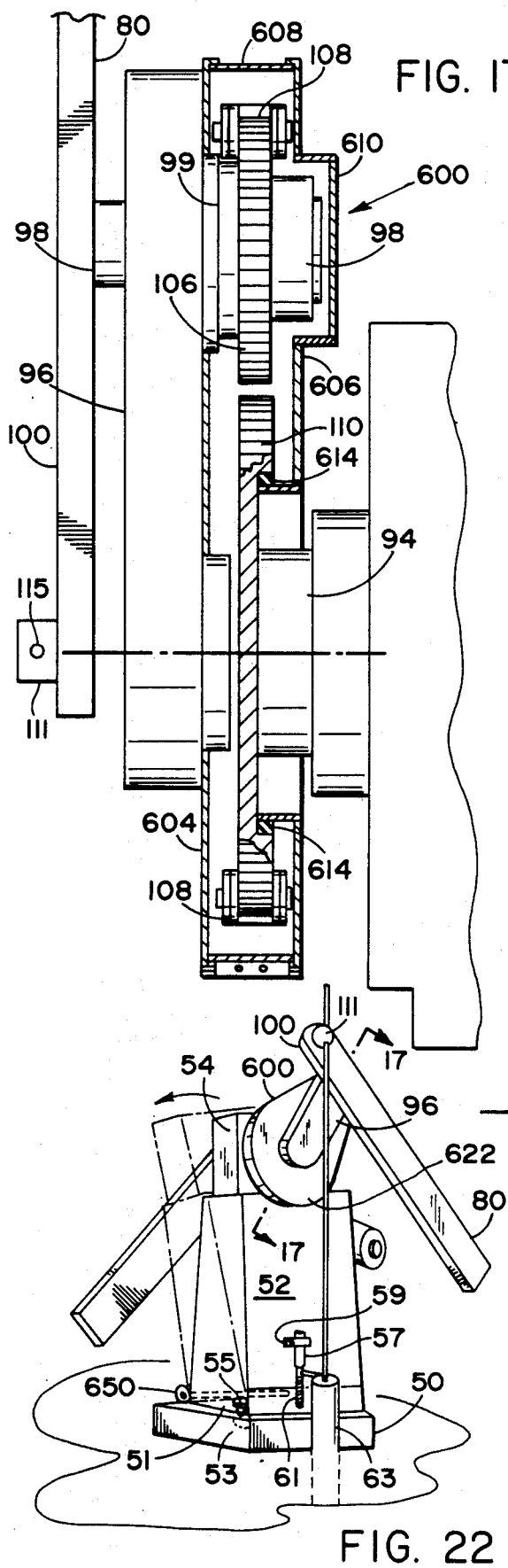
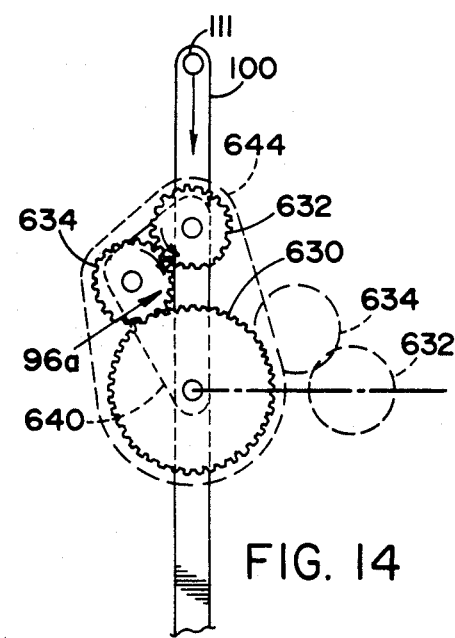
FIG. 14
FIG. 15
FIG. 17
FIG. 22

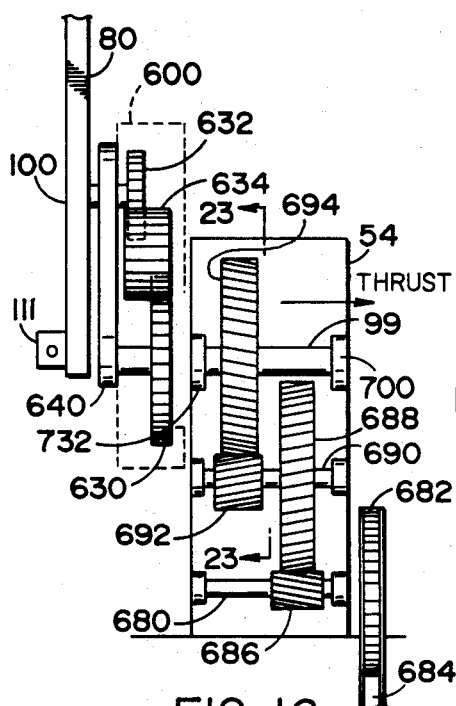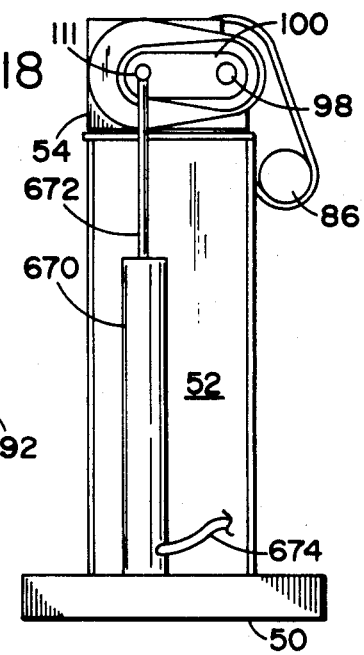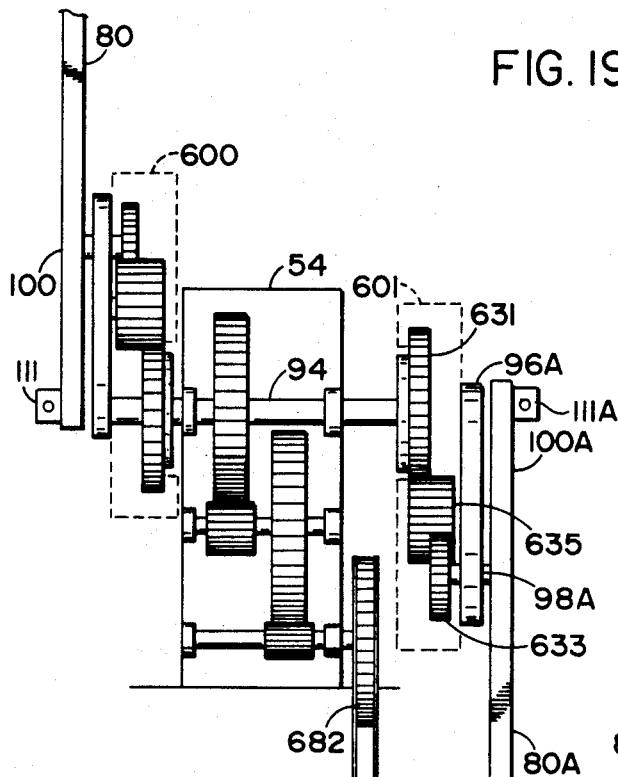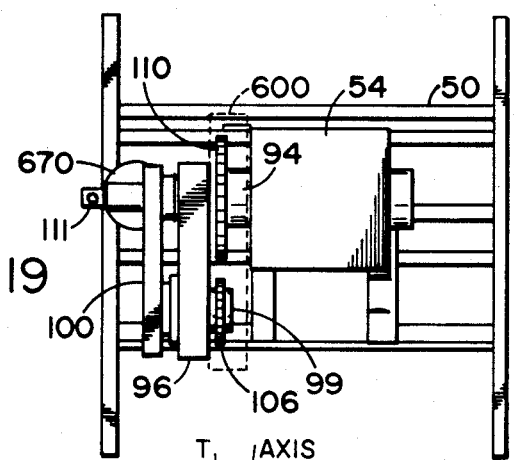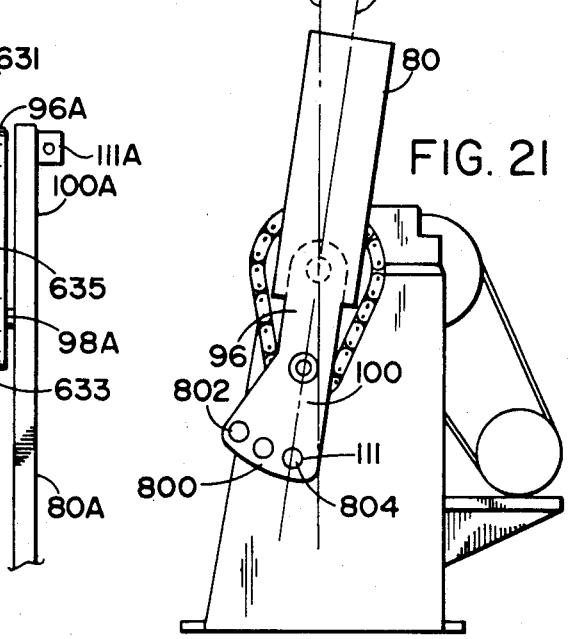

PUMPING DEVICE

This application is a continuation-in-part of my prior application entitled Pumping Device, bearing Ser. No. 443,758, and a filing date of Feb. 7, 1983, now abandoned.

BACKGROUND OF THE INVENTION

1. Field of the Invention

The field of this invention is within the field of providing lifting action to a lift pump by changing rotary motion to reciprocating action. The invention resides within the field of pumping units, such as those used for oil well pumping. It also resides within the field of using a rotary drive such as a gear reducer, to cause a rod pump to move in a reciprocating manner. More specifically, it provides for improvement to a reciprocal rod pump having members that move in opposite rotational movement at the same angular velocity.

2. The Prior Art

The prior art with respect to pumping and more particularly, rod pumping units for oil wells, involves a substantial number of various units.

The most common units are those which have a horsehead and cable passing thereover. The cable is attached to a polished rod that is in turn connected to the pump string and pump of a rod pumper.

Such rod pumps are lifted in a reciprocating manner by means of a horsehead, walking beam and Pittman rods connected to a crank arm assembly. The crank arm assembly is in turn connected to a gear reducer that is driven by a motor. There are other variations of the foregoing units that incorporate various balancing systems and lifting configurations. Some are classified in a manner depending upon the point of lift and the position of the Pittman arm connection to the beam. Others incorporate various pneumatic and hydraulic assemblies.

Regardless of the foregoing types of assemblies, most are either relatively large, inefficient, impractical, or ungainly. To the contrary, the invention described herein incororates apparatus of a substantially smaller size than the prior art and is relatively compact and quite efficient.

The smaller size of this unit lends itself to offshore platform usage where size is critical. Also, from the mere standpoint of aesthetics and environmental considerations the invention has substantial appeal over the prior art.

In addition to the foregoing improvements as to size and general overall adaptability, this unit has superior operating features over the prior art. In general, the prior art did not have the ability to symmetrically handle the load of the pump string and column of oil throughout the pumping cycle. To the contrary, this invention has uniform operating characteristics through its operating cycle. This effectively provides a more uniform torque factor curve, acceleration curve and higher permissible loads for many applications. This is most important in light of the substantial loads that are now encountered in deep well applications.

It has been stated that if the prior art could formulate a pumping unit with an infinite Pittman rod, many problems could be solved. In effect, if the angular offset of the Pittman rod could be nullified, and the rod infinitely extended, the variances in torque factor could be eliminated. This is due to the fact that the force vectors at certain pumping positions within the cycle vary with respect to others. The crank when attached to the Pittman rod causes various torque factors with respect to the various rotary driving angles it encounters.

The invention hereof creates a symmetrical lifting force at either end of the stroke and a correspondingly symmetrical torque factor at either end of the stroke. Not only is the torque factor symmetrical at either end, but it is also symmetrical on either side of the midpoint of the stroke. This causes substantially uniform wear and loading on the gear reducer and other bearing points.

The overall effect is to provide a much smoother and symmetrically driven pumping unit. As can be understood, this eliminates the many inconsistencies of the prior art. It furthermore allows for greater permissible loads in most pumping applications.

Another drawback of the prior art resides within the huge walking beams required of prior units. Attendant with the walking beam is the requirement of support by means of a Sampson post. The Sampson post and walking beam require large amounts of steel and various supporting structure, and attendantly large bearings.

The foregoing elements require a large static structure and a large operating space. This has been a particular drawback in using such units in offshore oil well applications, as well as in crowded well loctions. Furthermore, such units require many safeguards to prevent injury to operating personnel.

The prior art units are an outgrowth of the original walking beam units which were in use over one hundred years ago. The various improvements in pumpers have been no more than add-on and corrective developments of the original pumping units. Although U.S. Pat. No. 1,712,927 to Martois discloses two arms with a chain drive similar to a portion of the invention hereof, Martois did not solve the problems of loading. Martois did not counterbalance and relieve the load from his timing mechanism such as the chain. Consequently, the chain might see such a load as to break since it is the substantial load of the well. Applicant's timing means reduces the load thereon so it is operative and functions to the time rather than to lift through the timing means or chain by virtue of Applicant's offsetting counterbalance.

Thus, the sprocket and chain or alternative gear embodiment of Applicant become timing devices rather than a load carrying device. The load on the timing mechanism is down loaded and reduced substantially, so that the timing mechanism serves a timing function in contradistinction to the Martois load bearing which could be greater than that seen through the main gear reducer.

Since the counterweights on an oil well pumping unit can lift eighty percent of the well load or more, the use of the counterweight has a great effect on efficiency as well as stability and prevention of a shearing of the timing mechanism, all of which Martois never addressed. Also, the counterweights of this invention rotate in opposite directions. Thus, the turnover moment produced by one is balanced by the other.

The counterweight eliminates the torque reversal problem, thus helping to prevent lash, large shock loads, and chain whip or tooth impact on the timing means.

This invention uses a novel structure with novel operating features to overcome the deficiencies of the prior art. The principle of operation and structure is developed through equally distanced first and second members that are rotated at opposite uniform angular velocities by means of gears, belts or a chain and sprocket drive. The members or arms are driven by a gear reducer in combination with a motor. The outer or second of the two arms or members is adapted for connection to a polished rod of a pump. It is counterbalanced to prevent shearing, lash and loading on the timing means to provide an operable unit over the prior art. This effectively provides a down loaded timer for this invention. The end result is a pumper which provides improved operation and structure with attendantly less cost of manufacture. The performance is such wherein the acceleration and torque aspects are enhanced, and the overall permissible load curves for most well conditions are improved.

As a further improvement, the invention hereof has a chain or gear housing when a timing chain and sprockets are used that provides an oil bath to the chain, sprockets, gears and bearings, including the support bearings between the first and second members. Thus, all bearings are internally lubricated except for the polished rod connection bearing.

Another feature hereof is the fact that counterweights on the members or arms can be offset as to top and bottom orientations of the polished rod to provide improved balance and drive with improved performance for the gear reducer. Also, in lieu of counterbalance on the members or arms, they can be balanced with a rod pumper by means of an air balance system or air cylinder.

This invention also lends itself to allowing one gear reducer to run two sets of arms or members simultaneously on either side thereof. This permits simultaneous pumping of two wells with one gear reducer with the improved aspect of this invention. Thus, one unit with two timing mechanisms hereof can pump two wells simultaneously and utilize the space of roughly one unit.

The gears of the mechanism for timing the movement of the members or arms connected to the polished rod can be eliptical, with an eliptically geared gear box. This can permit a slow acceleration of the polished rod when the lesser rotation or angular velocity of the arms takes place due to elipsoid timing by the gears.

The gear box can also have its bull gear oriented for lift by the gear train to relieve the bearings thereof, as well as orienting the gears of the reducer to minimize thrust on the main shaft.

A specific feature of the counterweight on the second arm in conjunction with the opposite counterweight balances rollover torque, reduces loading dramatically on the timing means, balances the operation of the unit to provide maintenance on the base structure and operability of the unit.

SUMMARY OF THE INVENTION

This invention provides a unique down loaded timing linkage driven by a chain and sprocket, or gear drive as improved herein, to create a smooth and symmetrical torque factor, acceleration curve and improved operation to a pumping unit such as an oil well rod pumper.

The invention more particularly provides an oil well pumping linkage with two arms or equal distanced members. The arms or members comprise one inner or first arm and one outer or second arm that are pivotally connected to each other for opposite rotational movement and are balanced for operational movement.

The first arm or member is connected to a drive means and caused to rotate about a central axis by such means as a gear reducer. The second arm or member is pivotally connected to the first arm and provided with a polished rod connection means at a distance equal to the distance between the axis around which the inner arm turns and the pivotal connection point.

The second arm is caused to rotate in a direction opposite from the first arm at the same angular velocity as the inner arm. The timing and driving of the angular rotational velcity can be by means of gears, a chain and sprocket drive, or other timed driving means, such as a belt. The second arm is counterbalanced to prevent list, shearing and torque reversals so that the arm can be operationally timed by the timing means.

To maintain the operation of the invention in a well pumping condition, the arms forming the linkage can be counterweighted. The counterweights can offset the load of the polished rod and pump string and the load or oil being pumped at a rotational angle so as to enhance the counterweight force beyond the top and bottom of the stroke.

The gears for causing rotational movement of the arms or members can be eliptical as matched to an eliptically geared gear box, to provide for various acceleration functions of the polished rod from its bottom or top stroke positions. The resulting force relationships are such that the gears or chain linking the first and second members in their angular rotational operation, serve the function of timing means to provide angular velocities that are relatively uniform with respect to each other, but vary as to acceleration at various points of rotation.

The invention incorporates a housing for the chain and sprokets, or gears, used for timing the rotational movement of the first and second members. The housing can be filled with oil and caused to lubricate the chain or gears while at the same time lubricating the connecting bearings.

In lieu of the counterweights, an air balance system with an air cylinder can be used to offset the weight of the pumping rods. Also, the compact relationship of the units allows it to simultaneously pump two pumps on either side of a gear reducer by using a like set of first and second members and timing chain or gears on either side of the gear reducer.

The gear reducer hereof can have its gear train oriented to provide upward lift by the gear teeth of the gear immediately preceding the bull gear or main shaft gear of the gear reducer, rotating in a lifting relationship against the bull gear. This serves to relieve the radial loading on the bearing supporting the main shaft. Also, when a helical gear reducer is used the gears can be placed on the appropriate side of the gear box to lessen axial thrust on the main shaft. This is particularly adapted by the configuration of this invention, and helps to provide increased bearing life by both axial and radial forces being diminished.

Finally, the invention can use an air or piston balance instead of the counterweight on the second arm to cause the invention to function. The substitution of the air balance for the counterweight permits operation of the invention to prevent shearing of the chain, gears, or other timing means on the second arm.

BRIEF DESCRIPTION OF THE DRAWINGS

The invention will be more clearly understood by refrence to the description below taken in conjunction with the accompanying drawings wherein:

FIG. 1 shows a conventional pumping unit for purposes of size comparison to the invention hereof.

FIG. 2 shows an illustrative embodiment of the pumping unit of this invention of the same pumping capacity of the unit shown in FIG. 1 in the same stroke position, which is substantially smaller, but not scaled as such.

FIG. 3 shows a side elevation view of the pumping unit of this invention with the arms of the unit in the initial lift position of the polished rod and a dotted alternative lifting angle which can provide angular rod lifting away from the overload.

FIG. 4 shows a view of this invention from the same side elevation with the arms of this invention in the lift position one hundred and eighty degrees from FIG. 3, or in the upstroke position in contradistinction to that shown in FIG. 3 with the alternative lift angle being shown in a dotted configuration.

FIG. 5 shows a side elevation view with the arms of this invention lifting the polished rod partially through the stroke, but more toward the bottom of the stroke.

FIG. 6 shows a side elevation view of this invention with the lift point toward the upper position opposite to that of FIG. 5.

FIG. 7 shows a schematic view of the arms and loads encuntered by the invention during its movement.

FIG. 13 shows a schematic view of the distances and orientation of the elements that form the operational linkage of this invention.

FIG. 14 shows a schematic view of a gear timed unit wherein the rotational movement of the first and second arms or member is controlled by gears and the unit is at the top of its stroke.

FIG. 15 is similar to FIG. 14 with the unit in the downstroke position.

FIG. 16 shows the gearing orientation of the gear reducer which has been oriented to effectuate superior loading and thrust on the gear reducer.

FIG. 17 shows the chain case and oil bath for this invention which lubricates the timing means and bearings.

FIG. 18 shows a side elevation of an air balance means of this invention to balance the load on the timing means or second arm.

FIG. 19 shows a view of the air balance means of this invention looking downwardly or on the top of FIG. 18.

FIG. 20 shows a view of this invention wherein the lift arms and timing mechanism have been placed in tandem on either side of the gear reducer.

FIG. 21 shows a view of the counterweight arm on the timing means wherein the weight has been angularly offset to provide for offsets beyond the top and bottom of the stroke.

FIG. 22 shows a quick means for moving the invention away from the well when the well is to be worked on.

FIG. 23 shows a side view schematic of the lifting action as seen in FIG. 16.

DESCRIPTION OF THE PREFERRED EMBODIMENTS

Figure 8:
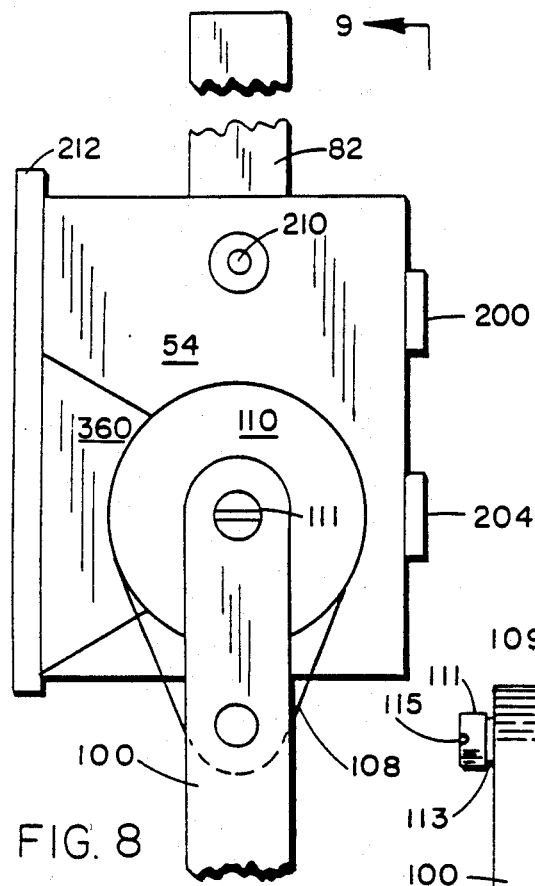
FIG. 8 shows a side elevation view of the invention with the arms in fragmented broken form.

Looking more particularly at FIGS. 1 and 2, it can be seen that a cnventional pumping unit is shown in FIG. 1, while the unit of this invention is shown in FIG. 2. The conventional unit, such as that shown in FIG. 1, has a platform 10 that supports a Sampson post comprising upright structural members 12 and 14. The upright structural members support a walking beam 16 pivoted for oscillatory movement upwardly and downwardly. A horsehead 20 is utilized over which a cable 21 is attached for purposes of allowing a polished rod to be drawn upwardly and downwardly.

The walking beam 16 is journalled within the bearing 18 to rotate in a rocking motion so that the horsehead moves upwardly and downwardly. The outer surface thereof allows the cable to be drawn in a relatively straight line to move the polished rod upwardly and downwardly at connection point 23.

The walking beam 16 is connected by means of two symmetrical Pittman arms 24 to a crank arm 26. The Pittman arms and crank arms on the opposite side are in symmetrical orientation and are hidden from view. The two respective ends of the Pittman arm are connected by means of bearing connections 28 at one end to the walking beam 16 and to the crank arms at bearing connections 30. The crank arms 26 have counterweights 32 attached thereto that can be oriented to provide various counterweight forces to be applied to the arms 26 in order to balance the effect of the pump string weight, or polished rod load.

The crank arm 26 is driven by means of a gear reducer 38 and journalled on a drive shaft 40 connected to the gear reducer. The gear reducer 38 allows for high speed drive by a motor connected thereto to be reduced to a sufficient level to rotate the crank arm 26. The motor is connected to the gear reducer by means of a belt connected to a sheave 39 which turns the gears of the gear reducer 38. As previously stated, the crank arm 26 is duplicated on the other side which is hidden from its view in a completely symmetrical manner, whereby the shaft 40 drives an arm 26 and Pittman 24 on the other side for connection to the walking beam 16 at a bearing 28.

The foregoing structure of a conventional unit has a substantial drawback, due to the fact that the torque on the gear reducer 38 varies, depending upon the position of the stroke. Additionally, the non-symmetry of the stroke is such that it does not provide for uniform, even stroke and crank operation. Conventional units have been in use for a substantial number of years and there has been no useful operational advance over the state of the art in basic units of the type shown in FIG. 1, except for the invention of Martois under U.S. Pat. No. 1,712,927. Although this unit has elements similar to the Applicant's unit, it will not practically function due to imbalances, offset loading and lash and shearing on the timing means.

The unit of this invention, as can be seen from the torque curves included hereinafter, substantially outperforms the lifting capability of a conventional unit in many cases, as well as providing for a less expensive means of manufacture and a substantially symmetrical lift pattern as to the torque factors and other operational characteristics. It also provides for an operational unit over the relatively inoperable mechanism of Martois.

The Pittman arm 24 of a conventional unit in its various pumping angular configurations renders a different loading at different positions on the arm 26 and concomitant loading on the gear reducer 38. The various torque factors and the increased power requirements at different portions of the stroke require substantial loading of the motor and drive means. As can be appreciated when the motor is loaded significantly, there is often greater power consumption. This particular invention enables the unit to operate with symmetrical torque factors, substantially different from the prior art. This is due to the fact that the invention does not incorporate any kind of linkage or Pittman associated with the prior art, which is differently oriented throughout the stroke movement.

It has been often stated that if an infinite Pittman arm in length, such as arm 24, could be utilized there would be no varying angle of orientation with regard to the Pittman to the walking beam and and crank arm 26. This would thereby create a situation where the overall operation of the invention would be symmetrical and there would be no variable torque. Inasmuch as the Pittman arm in effect cannot be designed to be of infinite length, such a device was never developed. This particular invention in effect solves the problem and provides the analogous solution of the infinite Pittman arm by creating a symmetrical permissible load curve at either end of a stroke to enhance the operation of this invention. The symmetrical permissible load curve is of particular balance and symmetry so as to incorporate the features that could be utilized if such an infinite Pittman arm 24 were developed. Accordingly, this invention not only provides less power consumption to the user, but also less wear, symmetrical torque factors, improved acceleration curves, and other features to enhance the overall operation of the invention.

Looking at FIG. 2, it can be seen that there are no Pittman arms, nor Sampson post members, nor other elements that are inherent within conventional units. This thereby eliminates the requirements for substantial structural elements, such as the Sampson post elements 12 and 14, the walking beam 16, the enlarged horsehead 20, the Pittman arms 24, as well as the other elements. In addition thereto, the Applicant's invention is approximately one third the overall size for the same capacity pump. This thereby allows for a significantly greater utilization of the invention in various areas. Furthermore, the downloading and balance of the timing mechanism thereof provides an operational unit, as distinguished over the prior art.

As a practical consideration, certain environmental considerations have to be considered when the local environment will not allow for a large conventional unit as shown in FIG. 1. To solve the problem where is a utilization of underground pumps, submersible pumps, and other contrivances which are eminently expensive, in order to solve the problem of avoiding the use of large units.

In addition to the foregoing environmental problems, oftentimes space is at a premium in such an area as an offshore drilling and pumping platform. Furthermore, in some cases wells are placed so closely together as to limit the use of conventional units in a compact adjacent relationship. Consequently, it is customary not to use conventional units shown in FIG. 1, but rather to use submersible pumps which are expensive to operate and are not as effective in many cases. Also, air balance units of smaller dimensions are used. The development of this invention with its smaller overall configuration which is approximately one third of the size of conventional units enhances the ability to use such units for such offshore pumping, and limited space areas with no field assembly required. Also, when the dual side by side mechanism is utilized it substantially doubles the output of one unit in the same space.

Looking at generalized FIG. 2, in comparison to FIG. 1, a platform 50 is shown with an upper structure 52 that forms a stand upon which a gear reducer 54 is implaced.

The gear reducer 54 is connected to a first arm of this invention that is hidden from view, that is connected to a counterbalanced crank arm 58 by a shaft 60 and bearing, thereto. A second counterbalanced crank arm is connected to the gear reducer 54, but cannot be seen because it is hidden from view. The gear reducer 54 is similar to the gear reducer shown with the conventional unit of FIG. 1.

The gear reducer 54 is such that it has a central drive shaft passing therethrough which turns the arms. The gear reducer is driven by a motor means that has not been specifically shown. The motor means turns a sheave 55 that is connected to the gearing of the gear reducer 54.

Each of the counterweighted arms have counterweights 66 and 68. The counterweights can be used to balance the loads on the gear reducer from the load on the polished rod and the other salient load considerations encountered in pumping units. It is most important to have a counterweight 66 in most well conditions or the well load will harm the timing mechanism of this invention.

On the counterweighted crank arm 58, a second arm 70 extends therefrom and has a polished rod connection point or means 72 which is connected to a cable or a polished rod directly for lifting the polished rod of a rod pumper within a well. This connection point 72 travels on a vertical reciprocating lift basis upwardly and downwardly as the respective arms 58 and 70 rotate. The foregoing reciprocating action of the arms will be detailed hereinafter in the specific embodiment, as well as their size and ther critical elements.

The counterweights 66 and 68 have been shown in a conventional manner for purposes of describing the invention hereinafter in detail, the elements of the unit will be analogized but designated with different numerals for purposes of the description to follow.

A first detailed embodiment of this invention will now be described in FIGS. 3 through 13. The counterweighted arms that were shown in FIG. 2 are shown as counterweighted arms 80 and 82. The weights 66 and 68 can be substituted by the weight of the arms 80 and 82 being of sufficient size to provide the counterweight.

However, it should be understood that in many applications variable counterweight is desired. As a consequence, counterweights 66 and 68 are shown in FIGS. 5 and 6. The weights slide up and down on the arms 80 and 82, and can be of any configuration so long as they counterbalance the weight on the polished rod.

An important consideration is that the counterweight of weight 66 or of arm 80 is used to down load the forces seen through the timing mechanism. As a consequence, they are of important consideration and must be established to protect the timing mechanism hereof to provide an operable unit.

The invention can utilize a platform 50 analogous to the prior platform of a conventional unit. The platform 50 supports a stand or pedestal 52. The stand 52 is similar to the prior stand described in FIG. 2. On top of the stand 52, the gear reducer 54 is bolted. The gear reducer 54 is driven by means of a motor 86. The motor is supported by means of a platform 87 which is braced by an angular bracing member 89. The motor 86 has a belt 88 attached thereto, which serves to drive the gear reducer by means of a sheave 90 connected to a gear reducer input shaft.

The gear reducer shaft turns the gear reducer 54 which in turn is connected to a drive shaft 94 passing through the gear reduce which provides the drive for this invention. The drive shaft 94 is connected to a first or inner drive arm 96 of this invention. The first drive arm or member 96 is shown as having rounded ends. However, the arm 96 can be in any configuration so long as it supports the operative elements of this invention which shall be described hereinafter. Also, it must have a particular dimensional relationship with respect to the operational portions of this invention.

The arm 96 is mounted on the drive shaft 94 for rotation by the gear reducer 54 and is supported by bearing housing 97 of the gear reducer. The arm 96 supports a second shaft 98 having an axis of rotation. In particular, the shaft is shown as a shaft 98 which provides support and rotation to an arm 100 which is the extension of counterweight arm 80. The arm 80 is generally required for proper operation of this particular invention and for applying counterweight with counterweight 66 to prevent damage to the timing mechanism unless other balance means are used. The operative inner and outer arms of this invention are the arms 96 and 100.

In other words, arms 96 and 100 form the operative arms and are to be in a particular orientation to be described hereinafter, and of a particular operative length. Arm 100 is counterweighted by arm 80 or counterweight 66 to effect the operation of the device to prevent breakage and imbalances thereof by down loading the timing mechanism. Thus, it should be understood that arm 80 provides counterweight functions and does not operate as an operative element with arms 96 and 100 but provides necessary down loading counterweight, which would be substituted by another balance or weighting means.

The shaft 98 has a bearing and housing 99 which serves to support the second arm 100 which is connected for rotation thereby in a manner whereby it lifts a lift point or axis, or center of connection 102 upwardly and downwardly. The lift point 102 is connected to a polished rod, such as polished rod 105 shown dotted in FIG. 5. The polished rod 105 at lift point 102 is lifted upwardly and downwardly in a reciprocating manner by this invention in a straight line motion to permit the pumping action by the pump string.

Figure 9:
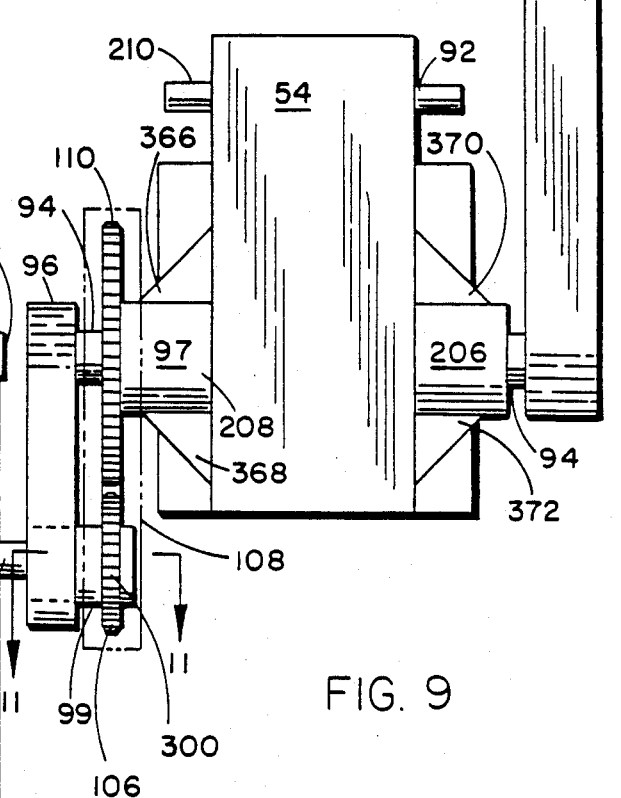
FIG. 9 shows a top plan view looking downwardly in the direction of lines 9—9 of FIG. 8.
Figure 10:
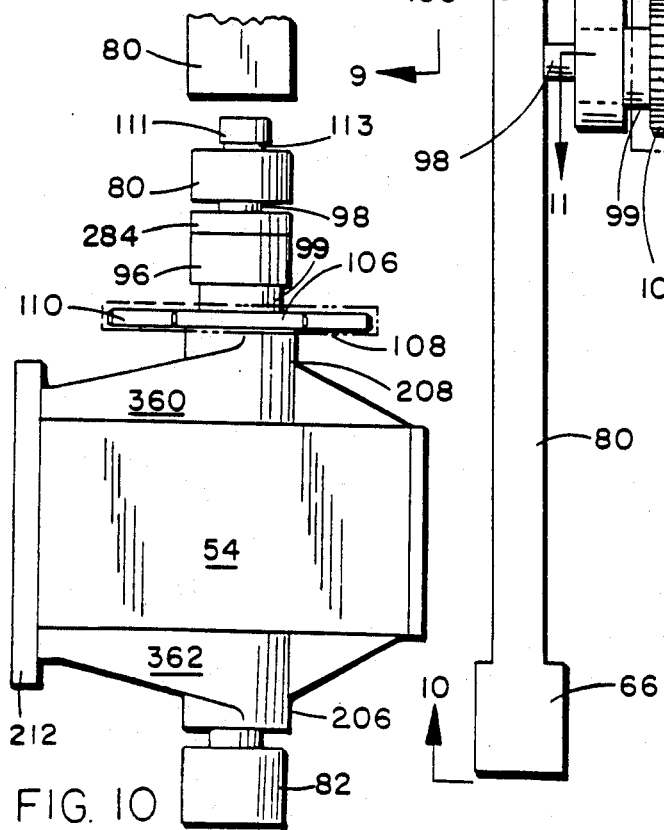
FIG. 10 shows an end view of the invention looking in the direction of lines 10—10 of FIG. 9.
Figure 11:
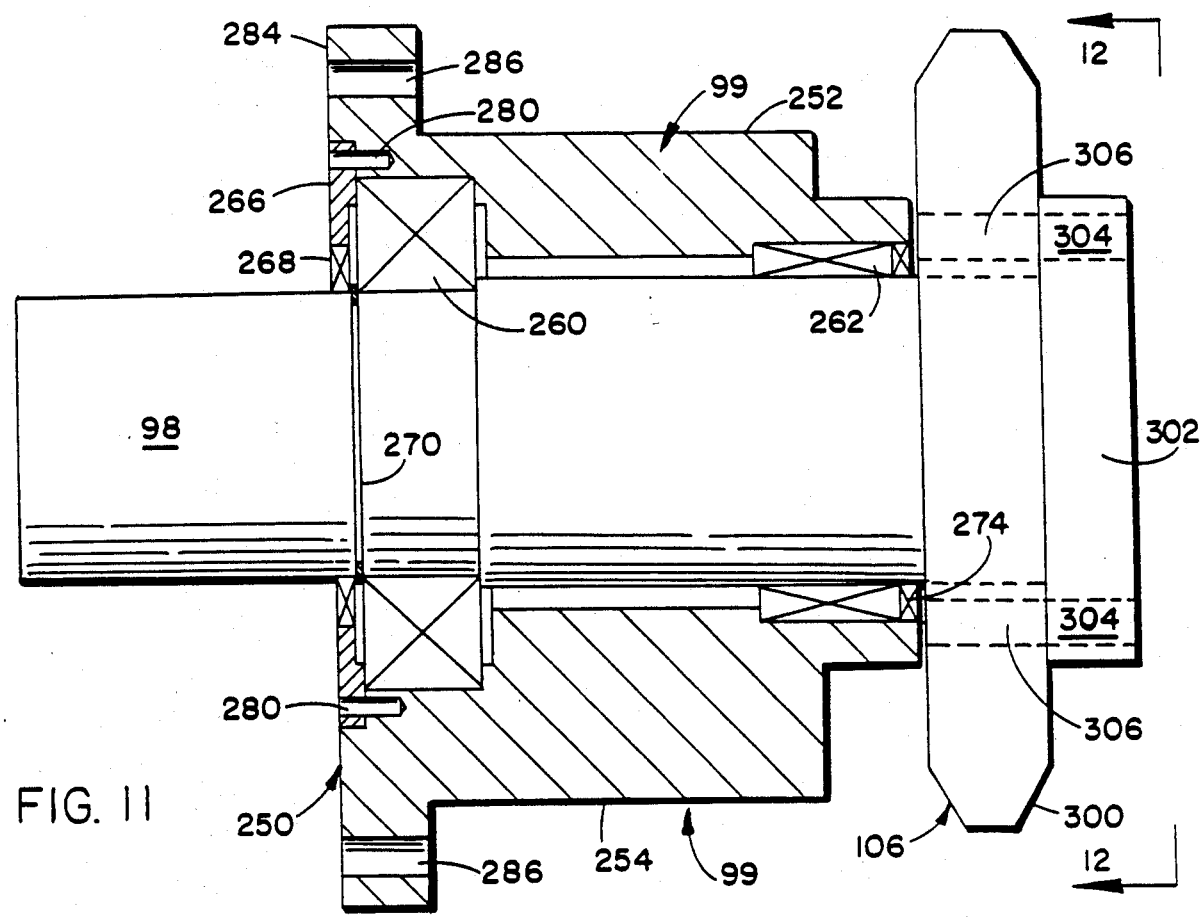
FIG. 11 shows a section of an eccentric bearing housing of this invention as seen in the direction of lines 11—11 of FIG. 9.

The polished rod connection at lift point 102 can be of any particular type, so long as it allows for the lifting action. As seen in FIGS. 9 and 10, it comprises bearing housing 109 allowing rotation as the arm 100 rotates. The bearing housing and bearing 109 allows a connection 111 to angularly rotate therein. The connector is on a shaft 113 which rotates in the bearing housing 109. A bolt attachment means for connection to the polished rod 105 lifts the rod and allows it to reciprocatingly be driven upwardly and downwardly by the connection point 102 allowing for relative motion with respect to the arm 100. The bolt attachment means can be in the form of a slotted opening 115 within the connector 111.

The distance between centers of shafts 94 and 98 is equal to the distance between the center of shaft 98 and lift or connection point 102. Arm 96 is equal to the length of arm 100 as to the distances of the arms between the center of the shafts 94 and 98 and shafts 98 and connection point 102. Thus, each arm in its operative mode constitutes one half of the operative linkage comprising inner arm 96 when combined and connected to outer arm 100 as connected on shaft 98.

The arm 96 can move either clockwise or counterclockwise, depending upon the pumping action, with the arm 100 respectively moving in the opposite direction about the axis of its shaft 98 or bearing. A sprocket 106 is connected by the chain 108 to a second sprocket 110. The second sprocket 110 is a sprocket that is fixed and does not rotate. Sprocket 110 can be fixed to the body or housing of the gear reducer 54, or secured from movement by any other suitable means.

The second sprocket 110 allows for rotation of the chain 108 thereabout, while it remains in its fixed position, thus causing sprocket 106 to rotate shaft 98. The chain 108 rotates around the sprocket 110 and causes the sprocket 106 to move in its journalled bearing housing 99 on shaft 98 on a basis whereby it rotates about the axis of shaft 98 and causes the arm 100 to which it is connected to rotate in connected relationship on shaft 98. This is due to the shaft 98 passing through arm 96 in its journalled relationship within the bearing housing 99 for turning arm 100.

The angular velocity of the arm 100 is fixed with respect to the arm 96 so that they both rotate at the same angular velocity. This is accomplished by providing the sprocket 110 with twice the amount of teeth as sprocket 106. Through this relationship, the two equal distances D and D respectively between the axis of shaft 94 and 98, and 98 and 113, allow the sprocket 106 to turn the arm 100 at the same angular velocity as the arm 96. However, they turn in reverse direction to each other. Stated another way, sprocket 106 is half the diameter of sprocket 110. The sprockets 106 and 110 can be replaced by sheaves of the same respective size turning a belt thereon in substitution for the chain 108. The belt can have timing tabs thereon for engagement with teeth on sheaves. The sprockets 106 and 110 with chain 108 can be substituted by means of a gear drive for turning arms 96 and 100 in reverse direction to each other at the same angular velocity, as set forth in FIGS. 14 and 15 or of any other suitable gear means.

The respective arms 96 and 100 turn in opposite relationship to each other, so that one is rotating in one direction while the other is rotating in the opposite direction as to their relative placement with respect to the clockwise or counterclockwise movement of each respectively. In other words, when the arm 96 is moving in a clockwise direction, the arm 100 moves in a counterclockwise direction. Nevertheless, the arm 100 moves at the same angular velocity as the arm 96.

The arms when in their top upright positions are in alignment with each other at the time they have respectively finished the upstrokes or the downstrokes when moving the polished rod 105 at connection point 102. The arms in their upstroke position are shown n FIG. 4, and in their downstroke position in FIG. 3. The positon as shown respectively in the upstroke at 12 o'clock and in the downstroke at 6 o'clock or respectively at three hundred and sixty degrees and one hundred and eighty degrees, can be oriented to pull in the top and bottom position at different angles. In effect, when the chain and sprocket, or gear, or belts, or any other timing means place the arms one hundred and eighty degrees apart at different angular orientations, the top and bottom of the stroke can also be angularly oriented away from twelve and six o'clock top and bottom pumping positions.

For instance, if an angular pull at two hundred and twenty five degrees at the bottom of the stroke and forty-five degrees beyond top dead center is desired, the chain and arms are merely oriented to accomplish this when they are extended. This is shown in dotted configuration in FIGS. 3 and 4. The foregoing can be accomplished by adjusting the arms with respect to the chain and sprockets or gears in an alternative embodiment. A practical solution to the angular pulling orientation is to extend the arms at the angle desired to their full length and then place or adjust the timing means to that particular position to effect the angle desired. It should be understood that once the timing means is set at any particular angle of the arms, the arms will continue to be fully extended at those top and bottom angular extensions.

The chain 108 functions so that it turns the sprocket 106 while it moves around sprocket 110 in a uniform manner. In some cases, an idler on arm 96 is sometimes beneficially utilized by allowing the chain 108 to pass over the idler and move in a manner to provide for smooth and non-lashing operation of the chain. The idler can also be used to tension the chain by moving within a bearing housing on arm 96.

In order to allow the chain 108 to turn over the sprocket 110, the sprocket 110 is fixed. The arm 96 rotates with the sprocket 106 on its shaft 98 moving within the interior of the chain as it moves around in a rotational manner with the sprocket 106 rotating and the sprocket 110 remaining fixed.

The sprocket 110 can be fixed in any manner, such as by struts or bolts affixing the sprocket 110 to the side of the gear reducer 54. The gear reducer 54 has its drive shaft 94 passing outwardly thrugh the sprocket 110 and is connected to the arm 96. The arm 96 is driven by shaft 94 with the sprocket 106 rotating around the axis of the shaft 98 to which it is connected. At the same time this causes the arm 100 to rotate in a counterclockwise direction to the arm 96.

The various positions of the outer or second arm 100 and the inner or first arm 96 are shown in their various positions in which they have moved in FIGS. 3, 4, 5 and 6. FIGS. 3 and 4 are respectively such that they show the position of the polished rod connection point 102 at the bottom and the top of the stroke. The dotted showings show the offset angles that can be provided so that wells that have a slanted casing can be accommodated with a slanted polished rod pull. FIG. 5 shows the position of the polished rod connection point 102 moving intermediately between the bottom position shown in FIG. 3. FIG. 6 shows the polished rod connection point 102 moving intermediately between the top point, where it will arrive at the position shown in FIG. 4. However, this action and placement of the arms in FIGS. 5 and 6 are directly reversed when they move in opposite directions from the foregoing movement. In the chain embodiment as set forth hereinbefore, it is necessary to have the counterweights 66 and 68 on the arms to prevent shearing of the chain. If not, the load is so great due to loads on the sprocket or timing mechanism, that it will damage or destroy the timing mechanism.

The foregoing chain 108, sprocket 106, and sprocket 110 can be substituted by way of a gear drive. The main emphasis is that the arms 100 and 96 be moved at the same angular velocity with respect to each other and in their reverse turning relationship. Secondly, the distance D which is the distance between the center of shaft 94 and 98, must be the same as the distance D between the center of the shaft 98 and connection point 102, or center of shaft 113. If gears are substituted for sprockets 106 and 110, they can be such that a main gear is substituted for sprocket 110 with a minor gear substituted for sprocket 106 and appropriate connection between the two whereby the main gear is twice the size of the minor gear. This can be seen in FIGS. 14 and 15. Also, the gears or chain and sprockets can be driven in connected relationship to the arm 96 by a hydraulic drive means turning arm 96 in the foregoing gear or chain relationship for rotating arm 100.

Looking more particularly at FIGS. 8, 9, and 10, it can be seen where a more detailed showing is seen. The showing details the portion of the drive and gear reducer 54 in its relationship to the invention. The parts shall be labeled analogously to those parts in the previous figures. Furthermore, a more detailed discussion of some points will be undertaken of the overall invention hereinafter.

As can be seen from FIG. 9, the counterweight arms 80 and 82 are shown. These respective arms 80 and 82 are used for the respective counterbalancing as described in the previous embodiment. Counterweight must be used in order to avoid shearing the chain and sprockets and is also preferable to prevent gear stripping if gears are substituted as the timing means for the chain and sprockets.

The gear reducer 54 has openings 200 and 204 therein for inspection of the interior, and lubrication. The openings 200 and 204 are such that they can be provided in any manner. The gear reducer 54 is a standard type of gear reducer that is utilized with respect to oil well pumpers such as the one shown as gear reducer 38 of FIG. 1 and are commonly available.

The gear reducer 54 is connected to the arm 96 by means of the drive shaft 94. The drive shaft 94 is such that it passes through the gear reducer in a bearing 97 and is supported by means of support bearing housings 206 and 208. The support members 206 and 208 can be horizontal support bearing housing support castings and form part of the case of the gear reducer 54. The gear reducer 54 is shown having a motor sheave attachment shaft 92 and a brake shaft 210 to which a standard drum or disc brake is attached as is known in the prior art in order to prevent the gear reducer from rotating. The shaft 92 receives a sheave 90 for driving the gear reducer 54.

A base plate 212 is seated and bolted to the pedestal or stand 52. The main shaft 94 or drive shaft passes through the reducer 54 and is connected to the first or inner arm 96. It is connected by means of a fixed connection to the arm 96 so that the arm can be rotated around the axis of shaft 94 and is controlled in a manner to be described hereinafter.

The large sprocket 110 is in fixed relationship to the gear reducer housing 54. It can be fixed against rotation by any suitable means, such as bolts, welding or a separate support means.

The small sprocket 106 is allowed to rotate in connected relationship on a shaft 98 in a bearing housing 99 in the manner previously described. The shaft 98 is directly connected to arm 100 for causing the arm to rotate in the reverse direction of arm 96, but at the same angular velocity.

The housing 99 is connected to the arm 96 with shaft 98 rotating in housing 99. This is seen in greater detail in FIGS. 11 and 12.

The bearing housing 99 is shown in its sectioned configuration. It includes a tubular portion or cylindrical member 250 which has an eccentric conformation formed as a thinner walled section 252 and a thicker walled section 254. This conformation with the thinner walled section 252 and the thicker walled section 254 allows the bearing housing 99 to be rotated within an opening of arm 96 so that it can eccentrically orient the shaft 98 to different dimensional locations.

The shaft 98 rotates within two bearings, namely bearings 260 and 262. The two respective bearings 260 and 262 can be formed as ball bearings, roller bearings, or any other type of bearing in order to support the shaft 98 as it rotates within the bearing housing 99.

The bearing 260 is secured within the bearing housing 99 by means of a bearing securement ring 266. The bearing securement ring presses the bearing 260 into its placement within the bearing housing 99 so that it can rotate freely within the bearing housing to cause the shaft 98 to be supported thereon for smooth rotational movement.

A bearing retaining ring 270 is shown retaining the shaft 98 within the bearing housing 99. Also, a seal member 268 is shown which provides a seal circumferentially around the shaft 98 so that lubrication can be retained within the bearing 260 and dust prevented from being passed onto the shaft surface as it rotates within the bearing housing 99.

A second seal 274 is shown for sealing lubricant in bearing 262 within the bearing housing 99.

The bearing housing 99 has tapped openings 280 surrounding the securement ring 266. The taped openings 280 receive bolts or screws in order to secure the ring 266 in place in its tightened position for supporting the bearing 260. It should be understood that any type of support means for the bearings 260 and 262 can be utilized wihin the bearing housing.

A unique feature of this invention is the offset shaft configuration as can be seen by the greater wall thickness 254 and lesser wall thickness 252. This eccentric bearing housing is supported by a flange 284 which circumscribes the housing 99 and has openings 286 therein. The openings 286 are bolted to the arm 96. The bolt pattern in the openings 286 are matched on the arm 96 so that the entire bearing housing 99 can be rotated for purposes of providing different locations to the shaft 98. This function and the reason therefor will be explained hereinafter in some measure.

In addition to the bolt pattern on arm 96 matching the openings 286 for rotationally orienting the housing 99 through the bolt pattern three hundred and sixty degrees, a series of arcuate slots can be utilized in the arm instead of matching openings 286. In this manner, the housing 99 can be rotated within the arcuate slot pattern in order to adjust it within the range of the different respective slots. The arcuately oriented slots underlie the openings 286 and thereby allow the housing to be moved in an adjustably rotatable manner within the arm 96. This allows for different distances between the center of the shaft 98 and the shafts 94 and 102.

The sprocket 106 is shown with teeth 300 passing therearound. These teeth, of course, receive the chain 108 in overlying relationship as shown in the various figures. In order to secure the sprocket 106 to the shaft 98, the shaft is provided with an outer cap or flange 302 secured to the shaft 98. This outer cap or flange 302 has openings 304 passing therethrough which can receive bolts that pass therethrough to openings 306 within the sprocket. These openings 306 within the sprocket can be threaded, or such that they can received bolts in any suitable manner to secure the sprocket 106 to the shaft 98.

Figure 12:
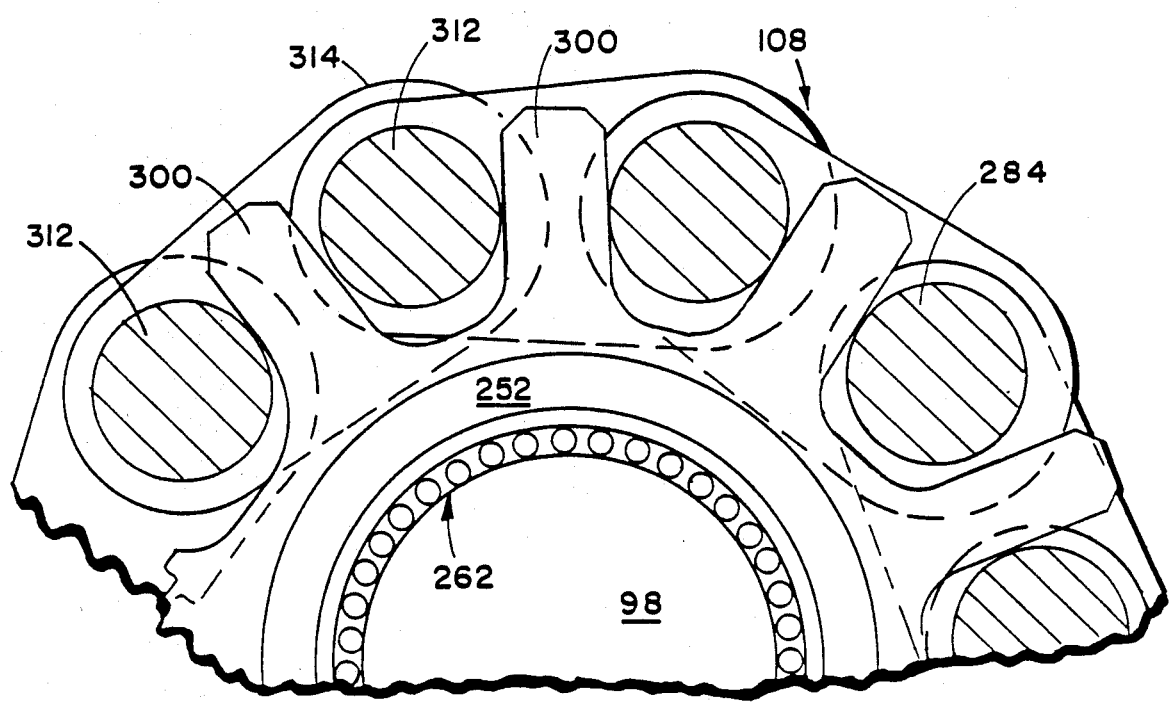
FIG. 12 shows a fragmented view of the bearing assembly and chain in relationship to the sprocket as seen in the direction of lines 12—12 of FIG. 11.

The chain 108 has been shown in greater detail in FIG. 12. In particular, the chain comprises a roller link configuration having rollers 312 secured by links 314. The roller chain can be a standard roller type chain or an engineering chain known in the state of the art for delivering power between two respective sprockets.

As can be appreciated, the chain 108 must be mounted over the sprockets 106 and 110. In order to do this, the respective bearing housings must support the sprockets 106 and 110. When they are formed in the eccentric manner hereof they can be rotated to apply greater or lesser tension on the chain. For example, when the shaft 98 is closer to shaft 94 by virtue of the fact that the lesser walled portion 252 is in its closest position to the shaft 94, the distance between the centers of the shaft 94 and 98 are less than when the larger walled portion 254 is rotated one hundred and eighty degrees in the direction of the shaft 94. Thus, the tension of the chain can be changed such that it can be loosened or slackened, depending upon the orientation of the eccentric bearing housing 99 within the arm 96.

In like manner, the bearing housing 109 which supports shaft 113 of the polished rod connection 111 can be eccentric. The shaft 133 is in effect analogous to shaft 98 and the bearing housng 99 is analogous to bearing housng 109. As the bearing housing 109 in its eccentric conformation is rotated, it increases or decreases the distance between the center of shaft 113 and shaft 98. This rotation is such that it can be matched exactly to the rotation of the two respective bearing housngs. This effectively allows the critical distances D between the center of shaft 94 and 98, and shafts 98 and 113 to be retained at the length to which they must be matched in order to operate.

The eccentricity of the bearing housings supporting shafts 113 and 98 when conformed within their eccentric bearing housings, allows for a change in stroke length. The eccentric relationship changes the relative distances between the center of shafts 94 and 98 and shafts 98 and 113. Thus, a bearing housing having an eccentric difference of two inches between the thick wall 254 and thin wall 252 can materially change the length of the operative arms in each particular case. This enlarges or decreases the length of the arms between the center of the shafts by a total of four inches. In this manner, the total stroke length can be changed by a distance of eight inches from the top to the bottom of the movement of the arms.

The change in stroke length from the foregoing example can be modified witin eight inches or greater, depending upon the eccentricity of the bearing housing and the relative thickness of the housing walls 252 and 254 with respect to each other. In effect, if housing wall 254 is one to two inches thicker than housing wall 252, it will provide a relative change in center shaft distance. This allows the entire stroke length to be changed.

Looking more particularly at the gear reducer 54 and its two bearing arm support portions 208 and 206, it can be seen that they are supported by means of upstanding brackets 360 and 362. The upstanding brackets 350 and 362 provide the support for the bearing housing extension supports 206 and 208. They are further provided with webs 366 and 368 attached to the bearing housing shaft support 208. Webs 370 and 372 are also connected to bearing housing support 206 to provide greater strength thereto.

The bracket members can be such that they support the bearing housing supports 206 and 208 by any particular means in order to hold the overhung load of the counterweights 66 and 68 in conjunction with the respective arms 80 and 82. Additional support can be in the form of a pillow block having a bearing for supporting shaft 94 in its extended relationship when it is extended from the housing support 208, or by enlarging the strength of the brackets 360 and 362. Regardless of what particular load is encountered by the shaft 94, it should be understood that any suitable means can be provided to support the shaft 94 in its housing and bearing housing 97 so as to allow for proper overhung load support by the gear reducer 54. Furthermore, the shaft 94 and bearing housing 97 can be of any particular size so as to accommodate both the torque and the load received on the shaft from the respective overhung load and torque. However, it should be understood that counterweight in well applications is required in the timing mechanism to offset and deload the forces as see by the mechanism to prevent a shearing of the chain or stripping of the timing means.

The pedestal 52 is shown attached to the base 50. This attachment can be hinged so as to allow the unit to be rocked away from a well for providing work over the well. To accommodate this, a hinged coupling between base 50 and pedestal 52 is utilized in the form of hinge 650 seen in FIG. 22. The unit can also be mounted on rails and slid back for workover.

To secure the pedestal 52 to the base when in use and prior to movement backwardly on the hinge 650, a pair of pins with brackets are utilized. These are shown as brackets 51 and 53 held together by a bolt or pin 55. The brackets 51 and 53 and pin or bolt 55 are on either side of the pedestal 52 and are hidden from view on the right side of the pedestal in FIG. 22, but can be seen in FIGS. 4 and 6.

When the bolt or pin 55 is removed from brackets 51 and 53 the pedestal 52 can be moved with respect to the hinge 650. The foregoing is accomplished by a jack 57 having a drive means such as handle 59. The jack 57 is connected between the base 50 and the pedestal 52 by a jack screw 61 so that as the handle 59 is driven, it can lift the pedestal 52 and tilt it back on the base as shown in FIG. 22.

Any means can be substituted for the jack screw 61 to drive the pedestal back on the base, such as a hydraulic cylinder, cable and sheave, or other means. The key is to tilt the pedestal 52 back on the base 50 to allow for clearance over the well area 63. This is further exemplified by the dotted configuration of the tilted back pedestal 52 in FIG. 22.

The two foregoing embodiments function generally as shall be described in FIGS. 7 and 13. Looking at FIG. 7, a showing is made of the loading on the respective arms and shafts. FIG. 13 shows a relationship of the distances and overall travel and operation of the arms.

More particularly, FIG. 13 shows the large sprocket 110, the chain 108, as well as the smaller sprocket 106. The configuration is shown in a schematic view in order to detail the movements. The schematic view shows the movement of the arms 96 and 100 in their relationhip to the respective elements in their basic functional movements.

In particular, the smaller sprocket 106 is shown in conjunction with the large sprocket 110. The two respective sprockets of course are joined by the chain 108 which surrounds the two respective sprockets and drives sprocket 106 in a rotational manner on shaft 98.

Shafts 94, 98 and 113 are shown as point locations on arms 96 and 100 in reference to the shaft centers. Arm 100 is attached to shaft 98 which it supports and shaft 113 is supported on arm 110 which is the shaft upon which the polished rod connection point 102 is attached to. In particular, polished rod connection point 102 is attached thereto on shaft 113.

The center shaft through sprocket 110 is shown as shaft 24 around which the arms 96 and 100 rotate. The shaft 94 is affixed to arm 96 and rotates it while sprocket 110 remains fixed. Shaft 94 connected to the gear reducer 54 rotates freely in sprocket 110.

The two respective lengths of the arms between the axis of shaft 94 and 98 and shaft 98 and shaft 113 comprising polished rod connection point 102 are each shown as being of length D. The length D should be the same for each arm 96 and 100. When the arms 96 and 100 are in directly vertical position along line T, denoting the travel of the center of shaft 113, the total distance is 2D, thereby making the total stroke length 4D.

The arms in their respective top and bottom stroke positions can be seen in FIGS. 3 and 4. The distance from the top of the stroke to the bottom of the stroke along line T is a total of 4D and denotes the position of the center of shaft 113 in the top position and the bottom position.

Thus, to have straight line reciprocating movement of polished rod connection point 102 along line T, the requirement is to have the two arms 96 and 100 be of the same respective length D, regardless of adjustments, and be driven in a manner whereby they rotate in opposite relationship to each other, yet are nevertheless rotated at the same angular velocity. The same angular velocity allows the movement on a timed basis to create the travel of the center of shaft 113 along line T.

A key to timed driven movement of the arms 96 and 100 for vertical travel of polished rod connection point 102 along the T, is to have the arms move at the same angular velocity. To accomplish this, sprocket 106 is one half the diameter of srocket 110. Thus, for matched drive, when a chain is used, sprocket 110 has twice as many teeth as sprocket 106 for driving the chain 108.

In essence, the timed relationship relies upon the distance D being the same between their support axis for both arms 96 and 100, with the outer sprocket being one half the diameter of the inner sprocket 110.

To effectuate the timed driven movement, the sprocket 110 and sprocket 106 can be substituted by a gear reltionship. In this manner, the sprocket 110 is substituted by a bull gear while sprocket 106 is substituted by a smaller gear. Between the bull gear which would constitute the replacement for sprocket 106, a pinion gear can be mounted. The pinion gear and the small gear allow for the rotational movement in a timed manner in order to turn the arms 96 and 100 in the manner described along line T. The small gear analogous to sprocket 106 and the pinion can be supported for rotation on the inner or first arm 96. The attachment of arm 100 is made to shaft 98 of the small gear for turning the arm 100 at the same angular velocity yet reverse direction to the arm 96. Also, the pinion gear can engage the bull gear by being a smaller gear formed on the small gear as a stepped down gear on the same shaft as the smaller gear, but of smaller diameter, but engaging the bull gear.

Accordingly, the sprocket and chain relationship can be substituted by having a large gear, a pinion and a small gear at the end of arm 96 substituted for the foregoing sprocket drive, with the pinion on the same shaft as the small gear, but smaller. At the same time, the connected relationship of the shafts and the bearing housings are equivalent and analogous as the prior embodiment, but for the fact that the pinion and small gear would be rotatably connected to arm 96. However, one gear need not be twice the size of the other as in a hypocycloid. Any number or combination of gears can be used so long as you end up with a two to one ratio.

Looking more particularly at FIG. 7, it can be seen that the loading considerations of the invention have been shown. Chain 108 has been shown with sprocket 106 and sprocket 110. The respective arms 96 and 100 have also been shown. These arms are connected of course on shafts 94 and 98. The polished rod connection point 102 has been shown which is the connection point of the center of shaft 113.

The respective arms 100 and 96 are loaded with counterweights symbolized as round masses. In particular, arm 100 is provided with counterweight 66 attached to counterweight arm 80. The counterweight arm 80 with the counterweight 66 is for purposs of preventing damage to the timing mechanism constituting sprockets 106 and 110 and chain 108. The well load is shown as a mass W constituting the well load connected to polished rod connection point 102 which travels along line T. The loads are usually so great, that if the counterweights are not used, the timing means will be stripped or sheared, due to the fact that it would see more torque than the counterweighted gear reducer.

In order to balance the weight of the well load W which constitutes the polished rod and pump string, the counterweight shown as counterweight 68 is shown connected to arm 82. The counterweight 68 is connected to counterweight arm 82 which is in turn connected to arm 96 through the gear reducer shaft 94 as extended through the gear reducer 54. This serves to balance and counterweight the loads on the gear reducer.

The load provided by counterweight 68 balances the well load W to prevent undue forces as seen through the gear reducer. The counterweight 66 on the other hand offsets the loads and torque as seen through the sprockets 106 and 110 and chain 108 or other timing means, which was not seen in the prior art. This generalized configuration of FIGS. 7 and 13 are exemplary of the various embodiments that can be utilized wherein the arms 96 and 100 are provided with the timed driving means, such as chain 108 and sprockets 110 and 106 with its respective counterweight 66. Other alternatives within the general disclosure of FIGS. 7 and 13 can be utilized to allow for the like lifting along line T of the polished rod connection point 102 for vertical lift.

The specific lift desired of point 102, substantially along line T can be outside of the vertical movement and along some other angle. This can be accomplished by orientng the arms 96 and 100 at an angular relationship in their top and bottom stroke positions, which equates to their fully extended relationship. Thus, if lift point 102 when at the bottom of the stroke is at an offset angle, such as seven thirty or forty-five angular degrees beyond the vertical line T, it will travel at a forty-five degree angle upwardly and be at one thirty or forty-five angular degrees beyond the twelve o'clock position. The foregoing lift would be at an angle forty-five degrees included to the right so that the bottom lift point would be at two hundred and twenty five degrees of rotation from the top of forty-five degrees of rotation. Thus, whatever angular offset to the vertical the arms 96 and 100 are when in their outstretched or aligned position at the top or bottom of the stroke, this angular position will follow one hundred and eighty degrees therefrom in the respective opposite top or bottom stroke.

In the foregoing manner, different well pumping angles can be effectuated for slant drilled wells, and other angular offset wells requiring a lift other than a vertical lift. Thus, line T can be offset at various pumping angles to be in line with any particular well slant.

A number of various advantages can be seen from the foregoing description and operation of the invention. In order to show in greater detail how the invention works, an eight-six inch stroke length of the invention will be compared to other prior art rod pumpers. These examples are exemplary only and are for purposes of comparison with respect to a given well situation. There are numerous and various well conditions and pump sizes that can be examplified herein.

Figure 24:
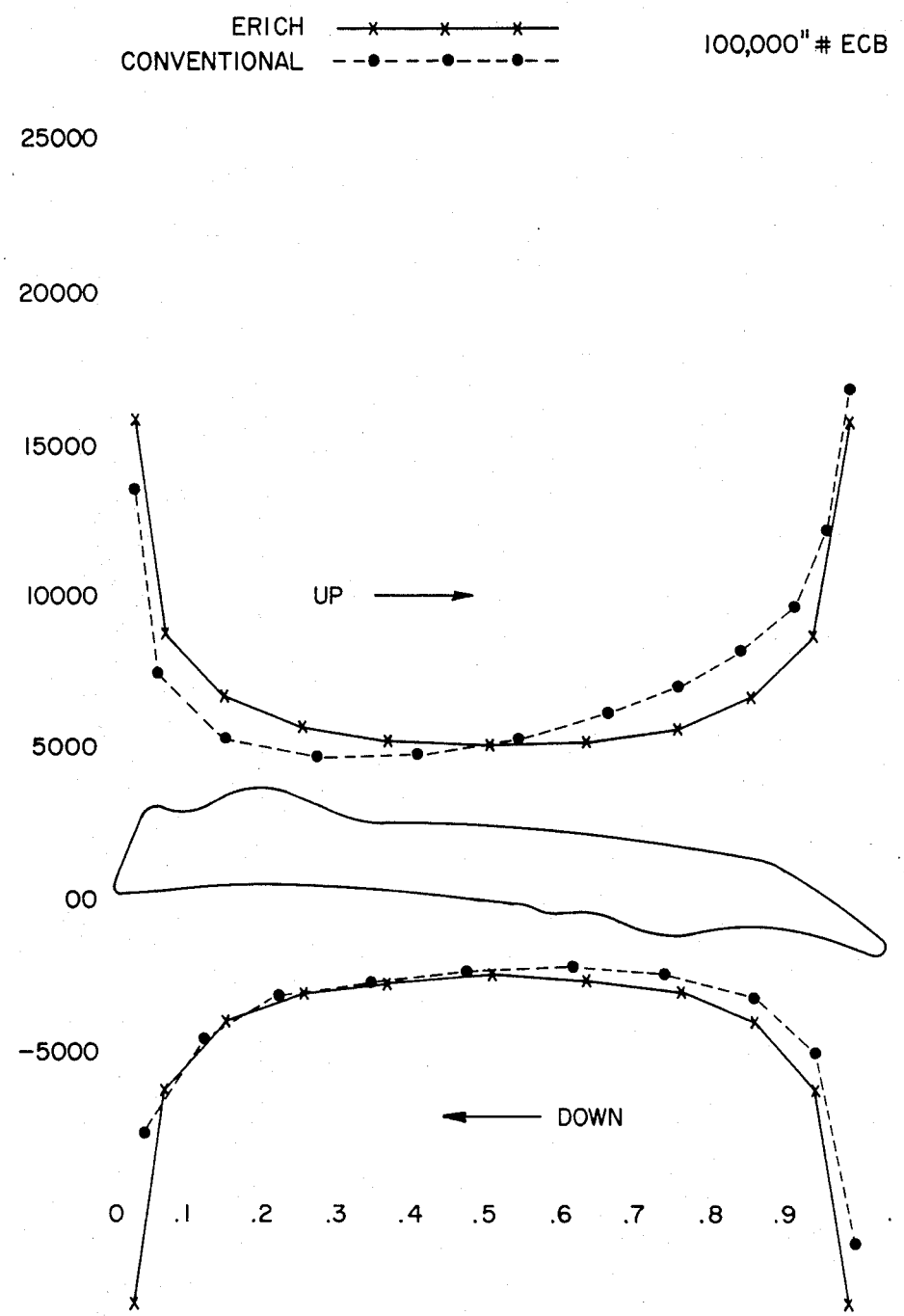
FIG. 24 shows the invention as compared to a conventional pumping unit with 100,000 pounds of counterbalance.

FIG. 24 exemplifies the symmetry of operation of the unit.

Looking at FIG. 24, above, it can be seen that the incremental position of the rod through its length of movement is shown for each respective position of the crank or arm 96. Fundamentally, for the crank or arm counterbalanced unit of this invention, the position of the arm is the angular distance measured clockwise from the six o'clock position.

The position of the arm 96 as to its degrees of movement is shown in Column 1, while the position in Column 2 is expressed as a fraction of stroke above the lower most position going from the bottom to the top and arriving at the bottom again for the zero position all along line T. As can be seen, the position is a symmetrical fractional position that is not seen in other devices of the prior art. Concomitant with this, the torque factor as seen in Column 6 is shown as a torque factor of relatively the same symmetrical smooth conformation going from the bottom to the top of the stroke and again downwardly.

The foregoing is extremely important, inasmuch as torque factor equals T over W, where T is torque on the pumping unit gear reducer, due to polished rod load W.

This smooth operation and symmetry from the bottom to the top of the stroke is such that undue torque factors and imbalances do not have to be accounted for. This puts less torque on the gear reducer, as well as providing less overall strain on the entire functional items of the invention. As a consequence, the structural loading is less, the gear loading is less in the gear reducer, and the attendant power consumption as to peaks and valleys tends to be smoother, rather than extremely overloading at any particular point, thereby providing less power consumption.

Figure 25:
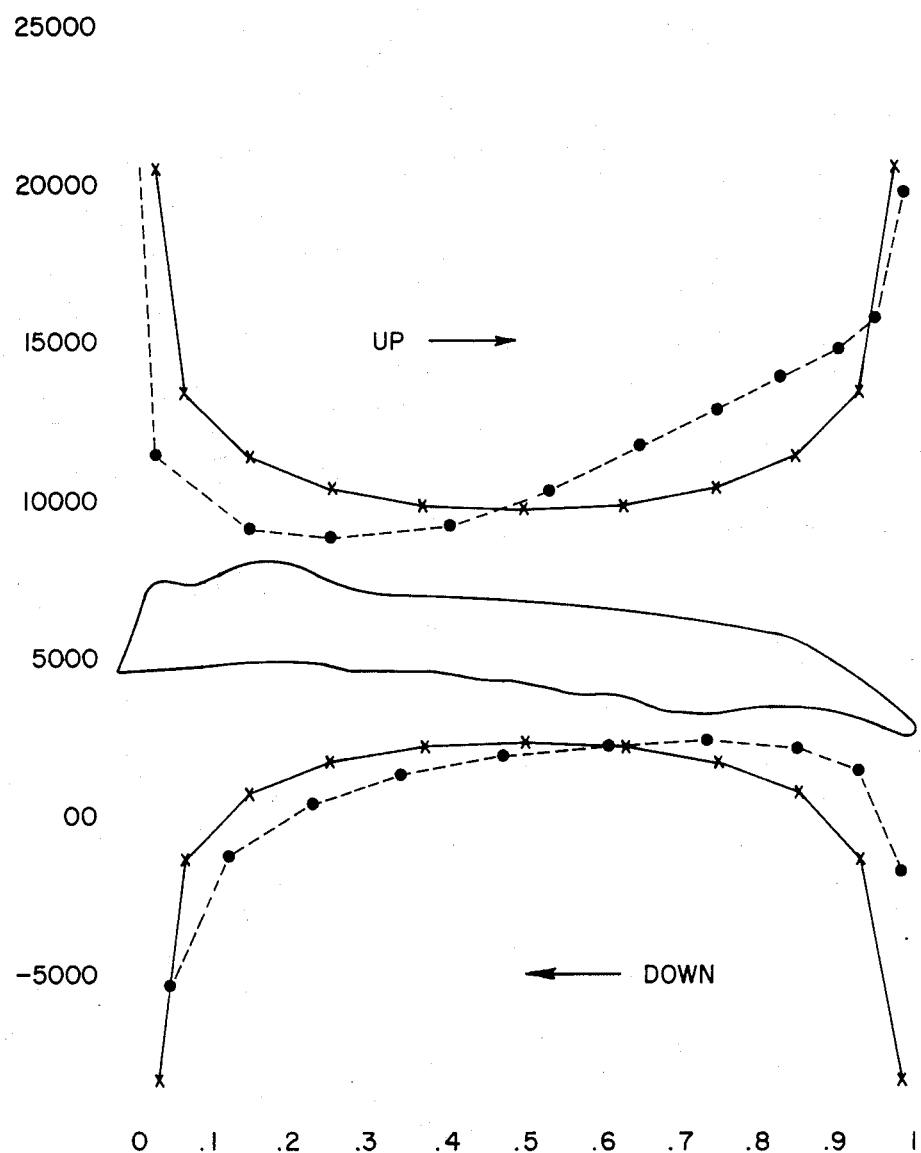
FIG. 25 shows the invention compared to a conventional unit with 300,000 pounds of counterbalance.
Figure 26:
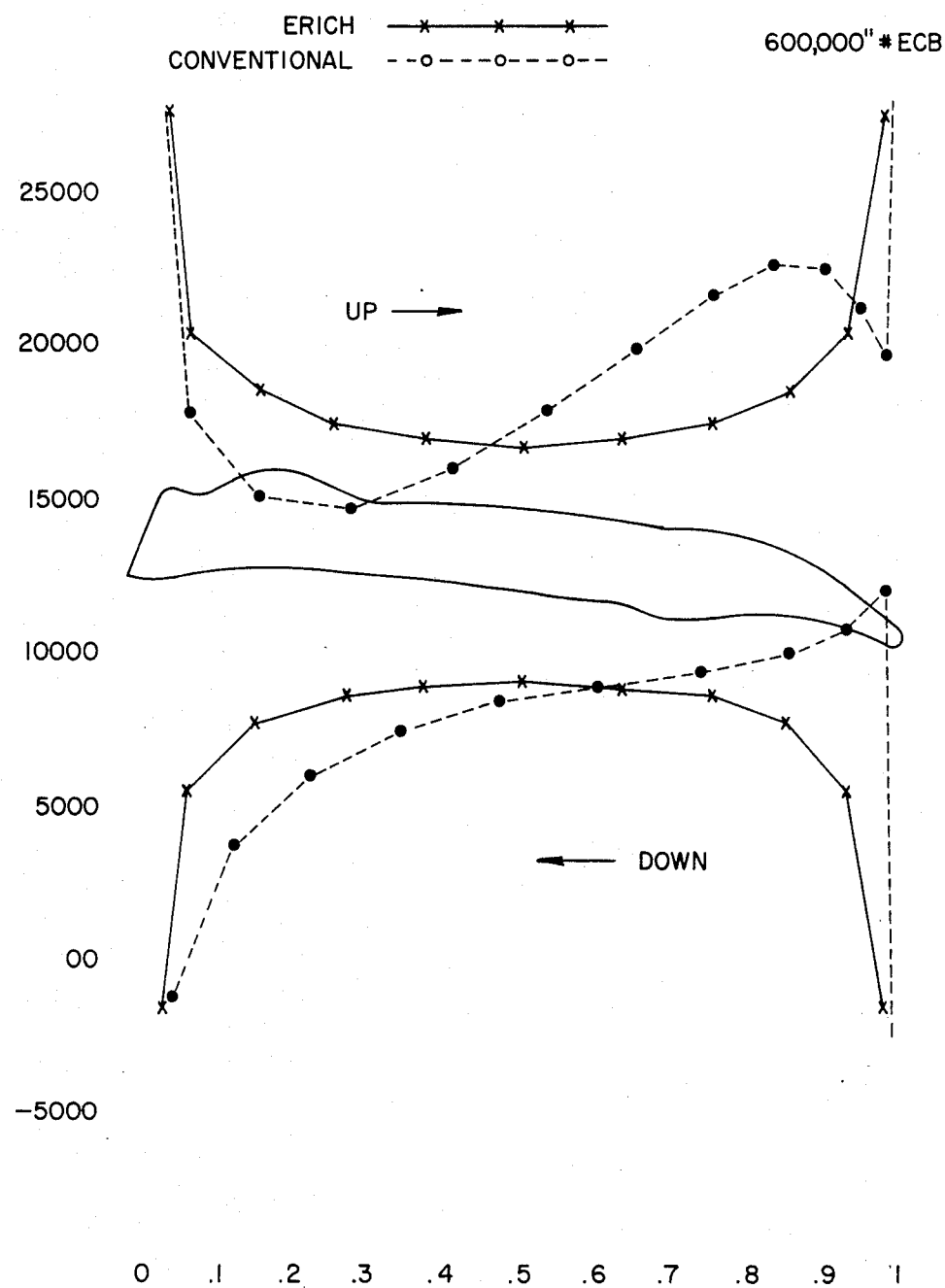
FIG. 26 shows the invention compared to a conventional unit with 600,000 pounds of counterbalance.

Looking more particularly at the comparative examples of the permissible load diagrams as seen in FIGS. 24, 25, and 26, the polished rod travel is plotted as a fraction of travel along the horizontal. A typical dynamometer card is shown inbetween the lines for a well application. These are with an effective counterbalance (ECB) of one hundred, three hundred, and six hundred thousand pounds. The permissible load is plotted along the vertical. The comparative example is for a given dynamometer card when theoretically comparing a conventional unit against the invention hereof.

These respective loadings can be seen with regard to both the upstroke in the direction of arrow UP and in the direction of arrow DOWN for the downstroke.

The polished rod travel as equated to the permissible load for the invention shows a symmetrical loading. Furthermore, it is thought that the invention can theoretically perform better over a wide range of pumping applications than the prior art. The invention produces permissible load curves which allow a greater fluctuation in load. This provides a wider range of permissible limits.

In prior art units a shift of range of permissible loads from low left to high right is due to the characterization of the Pittman arm beng angularly dioriented with regard to the different respective positions of the crank arm, such as crank arm 26, as shown in FIG. 1. This causes a dramatic shift in prior art conventional unts which is also seen in the Lufkin Mark II unit. All the units of the prior art have the built-up angular shift of the Pittman arm which causes the problems thereof. In effect, if the infinite Pittman arm were a reality, the problem would be solved. This is exactly how this invention solves the problem by avoiding angular disorientation shift in a practical unit that downloads any torque on the timing mechanism.

Figure 27:
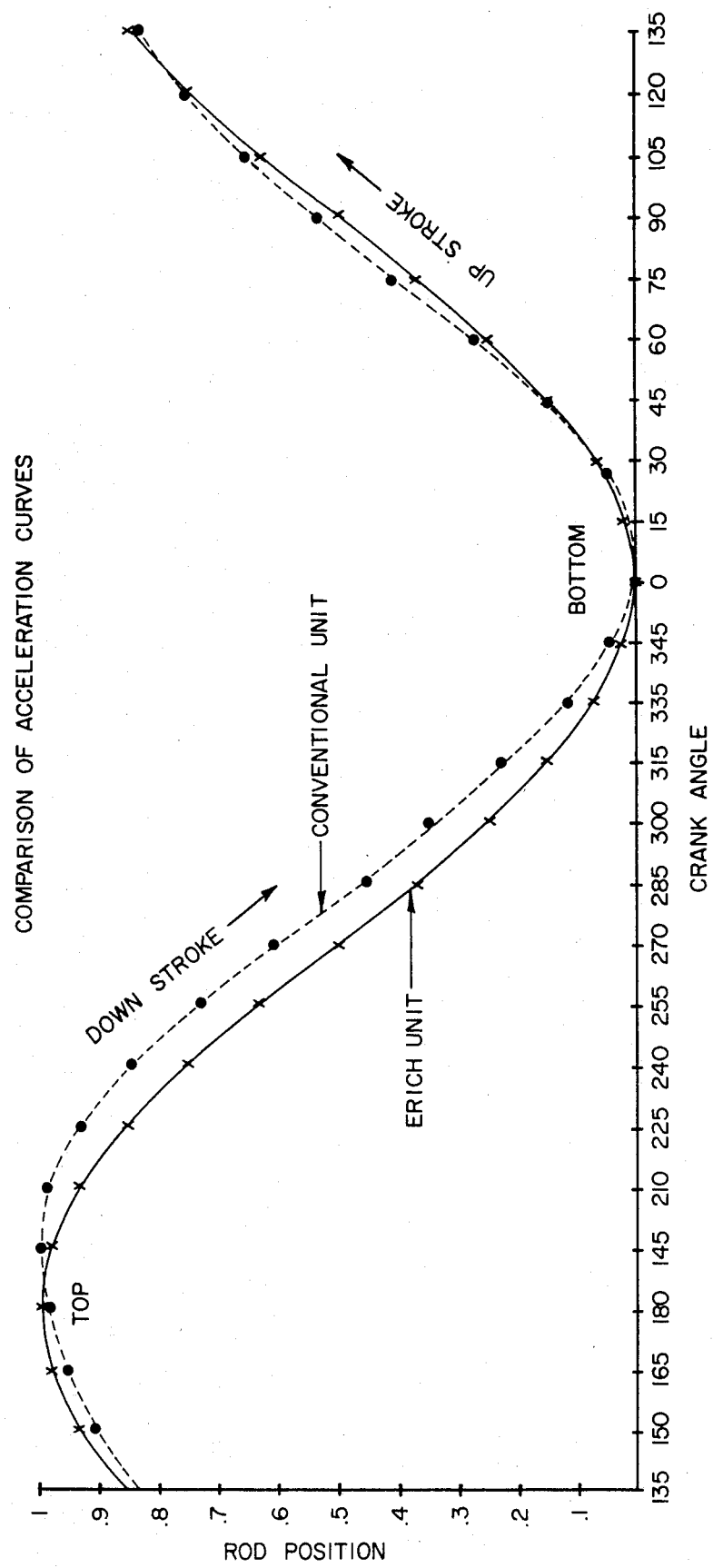
FIG. 27 shows a comparison of a conventional unit to the invention hereof with respect to the acceleration curves.

A comparison of the acceleration curve shown in FIG. 27 shows different acceleration characteristics of the unit over the prior art. For purposes of comparison, it has been shown with regard to the fundamental upstroke position and downstroke position at the respective tops and bottoms of the stroke.

From the foregoing, it can be seen in FIG. 27 that the upstroke and downstroke positions are enhanced as to acceleration of the polished rod. This provides less polished rod stretch and concomitant pump string stretch. As is known in the prior art, sometimes the pump does not catch up at all with the polished rod and is left to function on a harmonic wave form in substantially deep wells. Thus, a smooth acceleration curve is extremely important and the invention is oriented to provide uniform and smooth acceleration of the pump string.

The foregoing acceleration of the invention not only diminishes these extreme forces that are applied to the structure and the gear reducer, but also enhances operation. It can be appreciated, that uniform acceleration allows for improved power consumption and in addition thereto, it allows for improved pump string functions. Thus, the barrel of the pump is more readily filled on a consistent basis and the entire pump string is not overstretched.

Alternative drives in lieu of the chain can be utilized such as a timing belt driven around sheaves substituted for the sprockets. Another drive is a toothed sheave and metal chain drive of the silent drive type commercially sold under the Hi Voy mark by Dodge Manufacturing. The important consideration to all the timing drives is the maintenance of the timed movement of the arms in the above described manner and the substantial elimination of loads and torque on the timing means.

Based upon the movement and acceleration of the invention, the device provides for improved torque factors with regard to the various positions of the stroke in comparison to the prior art. Attendant with this is the symmetrical curve of the up and down strokes. This accommodates less structural stress, less torque on the reducer and less power consumption, with enhanced efficiency. Finally, the acceleration curve is improved so as to be on a symmetrical basis with regard to the action of the pump, to improve pump performance in the well.

Accordingly, the idealized infinite Pittman arm relationship that has been spoken of as being the goal to achieve within the oil pumping art has been achieved by this invention.

As previously stated, FIG. 17 shows the timing means casing of this invention which can encapsulate the chain 108 which has been shown as a chain at either end of a case 600. The showing in FIG. 17 is fundamentally on a sectional line through the horizontal portion of FIG. 9, as well as line 17—17 of FIG. 22. In order to graphically show the case 600 in FIG. 9, it is shown as a dotted configuration surrounding the chain and sprocket in the same conformation as the chain overlying the sprockets.

The sprockets 106 and 110, respectively the minor sprocket and major sprocket, are shown connected to their respective shafts, namely shaft 94 which is the main gear reducer shaft and shaft 98 which is the shaft around which the minor sprocket 106 rotates.

It should be understood that the sprockets 106 and 110 and the chain 108 can be substituted by means of a small and large gear with an intermediate gear therebetween. The fundamental movement and timing does not alter, but the case 600 surrounds the drive so that it is sealed and attached thereto for purposes of providing a lubricating sealed bath to the mechanism. Thus, the chain 108 and the respective small sprocket 106 and large sprocket 110, or gears in the alternative, are completely immersed in an oil bath as they rotate. They are sealed by the closure 600 therearound in order to prevent any kind of deterioration and problems associated with the introduction of dust, dirt and deleterious substances.

To more clearly amplify the invention, it can be seen wherein the polished rod connection means in the form of the connector 111 is shown with its polished rod connection slot or opening 115. The arm 100 is shown with the counterweight arm 80 that has been fragmented, and which rotates around the shaft 98. The inner arm 96 is shown connected through the bearing 99 with the housing 600 attached thereto.

The housing 600 can comprise an outer wall portion 604 and an inner wall portion 606. The inner wall portion can be sealed to the outer wall portion by means of a circumscribing wall 608 welded to the inner and outer walls 606 and 604. Also, the surrounding wall 608 can commprise a teflon or other smooth bearing material to protect the chain, and can be sealed by bolts around the walls 604 and 606 passing between the walls. Thus, the circumscribing wall 608 can be welded or bolted to the inner portion 606 and outer portion 604 in order to provide a seal.

A bulbous projection of the inner wall 606 is shown in the form of a boss or projection 610 to allow for the sprocket hub around the shaft 98 to be accommodated thereby. Furthermore, the housing 600 is sealed to the sprocket 110 by means of a surrounding seal 614. Seal 614 can be substituted by any other suitable means to seal the interior of the case 600 to prevent the escape of oil or other lubricant.

From the foregoing, it can be seen that the casing 600 rotates with the sprocket 110 or would rotate with the arm 96 as the shaft 94 turns. In turn, the second sprocket or minor sprocket 108 rotates around the main sprocket 110 with the chain 108 and within the oil bath case 600. The inner arm 96 or first arm which is connected to shaft 94 turns and causes the travel of the minor sprocket 108 to rotate on the shaft 98, thereby turning the arm 100 connected thereto for reciprocal movement.

A showing of the side view of the case 600 can be exemplified in the showing of FIG. 22 wherein it can be seen that the arm 96 is shown connected to the arm 100 and the chain case 600 is shown with the expanded portion surrounding the large sprocket 110 and the diminishing portion surrounding the smaller sprocket 108. Thus, the casing 600 appears as a pear shaped or eccentric member to cover the larger and smaller dimensions of the sprockets or gears in the alternative.

With the sealed configuration of the chain casing 600, it can be seen that the entire mechanism is maintained in a sealed condition. The sealed condition is such wherein the chains, sprockets or gears can be maintained in a oil bath on a constant basis without further lubrication. Furthermore, the oil bath allows for a lubrication of the bearings 99 and the bearings surrounding shaft 94 so that complete lubricity is provided to the respective bearings surrounding shafts 98 and 94. Thus, the bearings are self-lubricated by the oil within the interior of the casing 600, as well as the chain and sprocket or the substitute gear means.

The foregoing provides for a situation wherein the rotational polished rod connection 111 which is supported on shaft 113 is the only portion that requires lubrication in its internal bearing surfaces by a grease fitting or other fitting into the bearing supporting the rotational polished rod connection means 111. In this manner, the entire mechanism is maintained in a sealed condition and moves with the arm 96 around the shaft 94 so that proper lubricity and operational characteristics are maintained for longevity and ease of operation.

Any particular chain case configuration, such as case 600 can be utilized. It has been shown as a tapered pear shaped chain case with a large end 622 terminating in a smaller end. This is due to the fact that it has been matched to the configuration of the larger first sprocket 110 and the smaller sprocket 106. In like manner, it would configure itself to this particular pear shape also if gears are used as in FIGS. 14 and 15. However, it should be kept in mind that any particular shape case can be utilized so long as it seals the sprockets and chain therein or the attendant gears.

Looking more particularly at FIGS. 14 and 15, it can be seen wherein gears have been substituted for the chain and sprocket combination. In this particular showing it should be noted that the gear 630 causes a smaller gear 632 to rotate through a pinion 634, due to the rotation of the member labeled arm 640, analogous to arm 96. The foregoing exemplifies the use of gears in any particular manner. However, it should be understood that the gear 634 can actually be a small gear attached to the gear 632, or any other gear configuration can be used to affect the appropriate timing by arm 640 moving in response to the shaft of the gear reducer turning it.

The arm 640 analogous to arm 96 is shown connecting the gears 630, 632 and 634. This arm 640 is shown in triangular configuration because of the fact that it has to mount the offset gear 634. However, any other type of suitable gearing configuration can be utilized.

The chain case is shown in outer dotted configuration as chain case 644. The chain case 644 is in like manner sealed to the large gear 630 so as to rotate around it on arm 640 and still be suspended so as to allow for the gear 632 and 634 to rotate and be immersed in the oil bath within the case 644. The arm 640 is the substitute arm for the arm 96, while arm 100 is shown with its polished rod connection 111 thereon.

The configuration shown in FIG. 14 is wherein the arm 60 and arm 100 are in the extended position in the upstroke. The dotted outline showing exemplifies the placement when the polished rod connector 111 is shown in its position halfway through the stroke on the downstroke.

FIG. 15 shows the polished rod connection means being moved on an upstroke with the arm 100 moving attendantly therewith to lift it upwardly. In the alternative, the dotted configuration of the gears on the left side of the figure shows the position thereof during the intermediate portion of the stroke in the upstroke position.

The showing of FIG. 22 exemplifies a dotted showing of the pedestal 52 being moved backwardly off its base 50 away from a well head through which the polished rod passes. This is accomplished by causing it to move backwardly on pins or hinge points 650 toward the rear of the connection point.

The lifting or moving backwardly can be accomplished by a jack screw turned by a handle such as 59 that rotates jack screw member 57 on jack screw 61 or any other hydraulic, pneumatic or other lifting means. This tilts the entire pedestal 52 backwardly so that the gear reducer 54 is tilted backwardly along with the remaining portion of the mechanism exemplified with the chain case 600 surrounding it.

In the foregoing embodiment, the arms 100 with the counterweight arm 80 and opposite counterweight arm 82 moves backwardly as well as anything connected thereto for workover of the well 63. Thus, there is no necessity to remove the pumping unit or do anything else for working over the well.

As can be appreciated, this is a substantial step over the prior art which requires movement and sometimes removal of the unit generally and disconnection of the horsehead or other inconvenient efforts. Thus, this means of lifting and tilting the pedestal 52 backwardly on the base 50, the mechanism and the entire pumper can be moved away from the well for vertical workover movement thereof.

Looking more particularly at FIGS. 18 and 19 it can be seen wherein an air balance unit has been shown. Air balance units have been known in the prior art for balancing specific oil well pumpers in various oil well applications. In such uses, an air cylinder is used with a compressor and regulating means in order to provide makeup air to balance the pumper load with a given amount of pressure.

This embodiment is exemplified by the showing of FIG. 18 wherein a pedestal 52 on base 50 is shown with an air balance cylinder 670. The air balance cylinder 670 is in turn connected by a piston rod 672 to the polished rod connection 111. The piston within the cylinder 670 can be balanced by means of any air pressure, such as air pressure from a compressor connected by a line 674 to a compressor that in turn can be connected to the motor 86 which is the motor of the unit described hereinbefore.

The other portions of the unit are the same as other parts of the invention and incorporate the base 50 as shown hereinbefore, as well as the gear reducer 54 connected to a shaft that in turn drives the arm 100 that is connected on shaft 98 depicted in FIG. 18. This includes the timing means of the gears or chain and sprocket. Thus, the air cylinder serves to download the timing mechanism in the manner of counterweights 66 or 80.

Looking more particularly at FIG. 19 which is a downwardly looking view, it can be seen wherein the gear reducer 54 is shown with a pedestal thereunder on the base 50. The gear reducer incorporates the output shaft 94 through its bearing housing which is in turn connected to the arm 96 connected to the second arm 100 or outer arm. Again, the shaft 98 is shown in a bearing housing for providing rotational support. The sprockets 110 and 106 are shown in dotted configuration surrounded by the chain case 600. The entire mechanism or timing means is substantially similar to that shown hereinbefore, including the chain case of FIG. 17 and the other portions thereof.

The one important consideration is that the air balance cylinder 670 is shown as a substitute means for any counterbalance on a counterbalance arm such as arm 80 or any counterbalance arm 82. Thus, it can be seen that there is a complete elimination of the prior art counterweight arms 80 and 82. In lieu thereof, the air balance cylinder 670 provides the complete means for not only offsetting the well load as seen through the gear reducer 54, but also the load as seen through the timing mechanism within the chain case 600, namely, sprockets 106, 110 and the chain 108 or alternative gears in the geared timing device of FIGS. 14 and 15. It should be understood that the air balance cylinder can be substituted by any fluidic chamber which provides pressure for counterbalance.

Looking more particularly at FIG. 16 it can be seen wherein a novel oil well gear reducer is shown as to the orientation of the gears within the gear reducer. In particular, an input shaft 680 of a gear reducer is shown connected to a sheave 682 that is connected to the motor by means of a belt 684 or other suitable drive means. The shaft 680 turns a small gear 686 that is connected to a large reduction gear 688 that is in turn mounted on a shaft 690. The shaft 690 has a second minor gear 692 connected to the main drive gear 694. The main drive ger 694 is mounted on shaft 94 which is the main output shaft of the gear reducer. The gears 632 and 634 have been shown mounted on an arm 640. The gear 630 is also shown, all of which is analogous to the showing of FIGS. 14 and 15. In addition thereto, a chain case 600 is shown.

The arm 640 is in turn connected to the arm 100 which has the counterweight arm 80 connected thereto and the polished rod connection means 111.

The bearings 700 and 732 that support the main shaft 94 are such wherein they normally receive a substantial amount of thrust. A unique portion of this invention is the fact that the gears have been turned so that the helical relationship is such wherein it is balanced out so that the thrust is in the direction of the arrow labeled "thrust".

Furthermore, the gears which have been oriented by the diagonal markings of the helical or herringbone orientations thereof provide lift to the shaft 94 as shown in FIG. 23. Shaft 94 is shown being lifted by the force of the respective gear to teeth of gears 692 and 694 that are turning in the direction of the arrows of FIG. 23 so as to provide lift in the direction of the arrow labeled "lift". In this manner, the orientation of the gears by their helical means and in the direction in which they turn, lift the polished rod connection point 111 through the upward stroke so that the bearings 700 and 732 are not loaded excessively due to the overhung load of the mechanism attached to the gear reducer. The foregoing is accomplished by means of making sure that the gears are rotating, namely gears 692 and 694, in the manner such that when the load on polished rod connection means 111 is the heaviest (i.e. when there is a well load thereon rather than in the down stroke), the lift by means of the rotational orientation of gears 694 and 692.

In other words, the orientation of the gears should be such wherein they provide a natural lift by rotating in the direction as shown in FIG. 23 during the well load being applied on polished rod connection means 111. In this manner, the radial bearing loading is less than the loading that would normally be seen if the gears were to rotate in the opposite direction during the point of lift.

Looking more particularly at FIG. 20, it can be seen wherein an identical showing on the left side of the figure is seen as that of FIG. 16. However, an additional tandem timing mechanism in gear case 601 is shown analogous to the mechanism in gear case 600 that is shown in FIG. 16. In effect, a duplication on the opposite side is shown wherein the shaft 94 extends outwardly into a gear casing 601 and is connected to a main gear 631 connected to a smaller gear 633 by means of an intermediate gear 635. The foregoing are connected to a counterweight arm 80a that is in turn connected to the outer arm 100a analogous to the outer arm 100 and a polished rod connection point 111a for lifting a polished rod load of a well in tandem with that of the opposite polished rod connection means 111.

An inner arm 96a is also shown connected to the outer arm 100a by means of a shaft 98a. Thus, the foregoing arm means allows a lifting of a second well load at polished rod connection point 111a in tandem with that of 111.

The showing of FIG. 20 provides for a unit that will pump two wells in side by side configuration in a narrow space. It should be understood that the prior art is such wherein it is sometimes very difficult to obtain sufficient space with regard to pumping well heads and this invention substantially reduces the entire space required for pumping. Thus, this is a substantial step over the art in allowing for tandem pumping in side by side relationship, due to the configuration disclosed herein wherein pumping can take place by the analogous means on either side of the gear reducer 54.

As an aside, the gear timing means of gears 630, 632 and 634 of FIG. 16 and the tandem timing gears of FIG. 20 in the cases 600 and 601 can be substituted by means of the chain and sprocket timing means.

It should be understood that the foregoing showing in FIG. 20 is such wherein one load on polished rod connection means 111 balances out another load on polished rod connction means 111a, as seen through the gear reducer. Thus, for proper orientation when one is in the upstroke, the other should be in the downstroke and vice versa. In this manner, there is a constant counterbalancing between the two respective loads on either side. Thus, the loads will offset each other and not force the gear reducer to be pumping in the same direction at the same time. This is accommodated by assuring that the polished rod connection means and the mechanism is rotated so that one is in the upstroke and the other is in the downstroke in exactly diametrically opposite positions. Furthermore, it should be understood that down loading or balancing counterweight 80 and 80z is utilized on either side to protect the timing mechanism in the same manner as in the one sided prior embodiments.

Looking more particularly at FIG. 21 it can be seen wherein a showing is made of an analogous pumping unit as seen in FIGS. 3 and 4. In this particular case, the counterweight arm 80 which is connected to the first or inner arm 96, which is in turn connected to a second arm 100, has an arcuate portion 800 with a plurality of openings 802 through 804.

The polished rod connection means 111 can be connected to one of the openings 802 through 804 so that a pulling along a vertical line can take place with an offset counterbalance. In effect, the offset is such wherein an upward vertical line of polished rod pull analogous to line T of FIG. 13 is shown. However, the counterbalance arm 80 and any counterbalance connected thereto, as well as arms 96 and 100 when extended in the full downstroke and upstroke positions are shown offset.

At the bottom of the stroke when a polished rod connection means is connected to one of the openings 802 through 804 outside of the axial orientation of the axis of alignment of the counterbalance arm 80 and arms 96 and 100 in their extended position, the counterbalance 80 tends to be on the downside or beyond overcenter movement as to its rotating movement. Thus, it is beginning to apply counterweight at a more significant rate than if it were in alignment along line T when the counterbalance is shown in a vertical orientation as in FIGS. 3 and 4 or in alignment with arms 100 and 96.

This offsetting of the counterbalance from the vertical orientation when the polished rod connection means is in the lowest position can enhance and accommodate movement by virtue of the counterbalance being beyond dead center and beginning to apply counterbalances to the polished rod connection means. This enhances the overall operation so that at the moment of bottom dead center upward movement of the polished rod connection means, advantageous counterbalance is being applied. When the well load is being applied at the top of the stroke, the counterbalance is in an advantageous position beyond bottom dead center, depending upon the type of well that is being pumped.

It should be understood it is not always desirable to have an offset counterbalance of the type shown in FIG. 21. However, when it is desired in the well load conditions by dynamometer card testing or other means is established, the arcuate portion 800 can accomplish this. Also, any other suitable attachment means in order to move the polished rod connection means 111 outside of the direct in line axis can be utilized.

As a consequence of the foregoing, this invention should be read broadly as a substantial step over the prior art in solving the problems attendant with the prior art, as to function, structure, torque, power consumption and other material aspects.

I claim:

1. A pumping unit for pumping a rod type pumper wherein a rod is connected to a pump within a well comprising:
    a gear reducer having a high speed input shaft connected to reduction gears therein for turning a lower speed output shaft;
    a first member connected to said output shaft for rotation around the axis of said output shaft;
    a second member connected for rotation on said first member having rotatable means for connection to a rod pumper wherein said distance between the axis of rotation of said first member to the axis of rotation for the second member is substantially equal to the distance between the axis of rotation of said second member and said means for connection to said rod pumper;
    a fixed gear means surrounding the axis of rotation of said first member;
    a rotatable gear connected to said second member for rotational driven movement of said second member around its rotational axis of connection;
    gear means connected between said fixed gear means and rotatable gear of a size related to said fixed gear means and said rotatable gear to provide timed movement of the rotation of said rotatable gear so as to cause the second member to which said rotatable gear is connected to rotate in reverse rotational movement from said first member but at the same rotational speed as said first member;
    counterbalance means connected to said second member to lessen forces seen by said fixed gear means and said rotatable gear; and,
    means substantially surrounding both of said gear means for housing said gear means.

2. The pumping unit as claimed in claim 1 wherein:
    said means substantially surrounding both of said gear means is a housing adapted for holding a body of fluid therein for lubricating said gear means between said fixed gear means and rotatable gear.

3. The pumping unit as claimed in claim 2 wherein:
    said housing means is substantially sealed around said gear means for holding a fluid lubricant therein so that as said first and second members rotate, said fluid is sealed therein by said housing means for lubricating said gear means.

4. The pumping unit as clamed in claim 1 further comprising:
    an oppositely matched first and second member fixed gear means and rotatable gear connected to said gear reducer oppositely from said first and second members and gears for providing tandem operation from said gear reducer to provide tandem pumping; and wherein, said first member and second member are oppositely phased from said oppositely matched members so as to provide opposite counterbalance loading between the two respective tandem sets of members.

5. The pumping unit as claimed in claim 3 wherein said counterbalance means comprise:
a fluidic cylinder connected to said second member and to a stable base in order to provide the counterbalance required to lessen the forces on the fixed gear means and said rotatable gear.

6. A pumping unit for pumping a rod type pumper wherein a rod is connected to a pump within a well for lifting fluid comprising:
a gear reducer having an input shaft and a lower speed output shaft;
a first member connected to the output shaft of the gear reducer for rotational movement about the axis of said output shaft;
a second member connected rotationally to said first member having means for connecting a rod of a rod pumper wherein the distance between the axis of said output shaft and the rotational axis of said second member is substantially equal to the distance between the rotational axis of said second member and the means for connecting said rod pumper;
a first sprocket means in fixed relationship surrounding the axis of said output shaft wherein said output shaft can turn while said sprocket remains fixed from rotation;
a second sprocket connected to said second member for rotation of said second member;
a chain between said first and second sprockets for causing said second sprocket to turn and attendantly turn said second member around said connection in the reverse direction to said first member and at the same angular speed thereof;
counterbalance means attached to said second member at a point removed from said rod pump connection means for diminishing loads as seen through the chain and sprockets; and,
shield means for substantially surrounding and housing said chain and sprocket means.

7. The pumping unit as claimed in claim 6 wherein said housing means substantially surrounding said chain and sprocket means comprises:
a sealed container for holding a body of fluidic lubricant.

8. The pumping unit as claimed in claim 7 wherein:
said housing means is sealed to said second arm so as to contain a lubricant therein which can gravitationally fall onto the chain and sprocket means as said second arm is rotated.

9. The pumping unit as claimed in claim 8 wherein:
said counterbalance means is a fluidically pressurized cylinder.

10. The pumping unit as claimed in claim 6 further comprising:
a tandem chain, sprocket and counterbalance means and first and second members connected to said gear reducer at the lower speed output shaft opposite from said first chain counterbalance sprocket and first and second member means wherein said first and second member means are phased from each other respectively to provide tandem pumping on either side of said gear reducer.

11. A pumping unit for connection to a rod of a rod pumper comprising:

a first member connected for rotational movement around a support axis;
a second member connected to said first member for rotational movement with respect to said first member having a rod pump connection spaced from the first and second member connection substantially equal to the distance between said support axis and said first and second member connection;
means for driving said first member around its support axis;
mechanical timing drive means for driving said first and second members at like angular velocities in reverse direction for causing said rod pump connector to reciprocally lift said rod pumper; and,
fluid counterbalance means connected to said second member for limiting loads as seen through said mechanical timing means.

12. The pumping unit as claimed in claim 11 wherein:
said mechanical timing drive means comprise sprockets and a chain drive comprising a first sprocket fixed from rotation and a second sprocket connected by a chain to said first fixed sprocket one half the diameter of said first sprocket for driving said second member.

13. The pumping unit as claimed in claim 11 wherein said means for driving said first member comprises:
a motor driven gear reducer having a high speed input shaft and a low speed output shaft which is connected to said first member for causing said first member to rotate at a lower speed than said input speed.

14. The pumping unit as claimed in claim 11 further comprising:
a lubricant case surrounding said mechanical timing drive means wherein a lubricant can be implaced therein for lubricating said mechanical timing drive means.

15. The pumping unit as claimed in claim 14 wherein:
said case is sealed around said mechanical timing drive means and is in connected relationship to said second member and rotates with said second member for lubricating said mechanical timing drive means.

16. The pumping unit as claimed in claim 11 wherein:
said means for driving said first member around its support axis comprises a gear reducer having a high speed shaft and a low speed shaft; and wherein,
said gear reducer gear means between said high speed shaft and said low speed shaft provides a final rotational gear movement to said low speed shaft in a manner which lifts said low speed shaft upwardly to lessen radial loads imposed on said low speed shaft.

17. The pumping unit as claimed in claim 11 wherein:
said fluid counterbalance means comprise a fluidic cylinder.

18. The pumping unit as claimed in claim 17 further comprising:
means for moving said pumping unit away from a pre-established connection point to a rod of a rod pump.

19. A method of pumping by lifting a rod pumper reciprocally comprising:
providing a first member for rotational movement around a support axis;

driving said first member around said support axis by means of a gear reducer having an input shaft and a lower speed output shaft to which said first member is connected to;

providing a second member in connected relationship to said first member for rotational movement with respect thereto;

supporting a rod pumper on said second member at a distance from said first and second member connection equal to the distance of said first and second member connection from said support axis;

driving said second member by second driving means at the same angular velocity of said first member but in reverse direction to cause said rod pumper to be reciprocally driven;

counterbalancing said rod pumper; and, housing said second driving means while at the same time lubricating said second driving means.

20. The method as claimed in claim 19 further comprising:

counterbalancing said rod pumper proximate to its support by fluid means that are pressurized upon loading of the pump.

21. The pumping method as claimed in claim 19 further comprising:

driving in the same manner a second series of members through said means for driving said first member around said support axis so as to provide a tandem pumping action from the same gear reducer output shaft.

22. The method as claimed in claim 19 further comprising:

counterbalancing said second member at a point removed from where said rod pumper is supported to lessen the driving forces seen when driving said second member.

* * * * *